(12) United States Patent
Tomohara et al.

(10) Patent No.: US 8,401,597 B2
(45) Date of Patent: Mar. 19, 2013

(54) MOBILE TERMINAL DEVICE

(75) Inventors: Fumiyoshi Tomohara, Kawasaki (JP); Kazuyuki Sato, Kawasaki (JP); Shinichi Kuranari, Fukuoka (JP); Manabu Sotodate, Kawasaki (JP); Toshiyuki Itoh, Kawasaki (JP); Yoshiya Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 12/796,856

(22) Filed: Jun. 9, 2010

(65) Prior Publication Data
US 2010/0317417 A1     Dec. 16, 2010

(30) Foreign Application Priority Data
Jun. 11, 2009   (JP) ................. 2009-140145

(51) Int. Cl.
*H04M 1/00*      (2006.01)
*H04B 5/00*      (2006.01)

(52) U.S. Cl. ................... 455/575.4; 455/41.1; 455/41.2; 455/90.3

(58) Field of Classification Search ................. 455/41.1, 455/41.2, 575.4, 575.3, 90.3
See application file for complete search history.

(56) References Cited

U.S. PATENT DOCUMENTS

| | | | |
|---|---|---|---|
| 6,028,764 A * | 2/2000 | Richardson et al. | 361/679.29 |
| 6,542,721 B2 * | 4/2003 | Boesen | 455/553.1 |
| 7,443,979 B2 * | 10/2008 | Kim | 379/433.12 |
| 7,962,186 B2 * | 6/2011 | Cui et al. | 455/575.7 |
| 2002/0072395 A1 | 6/2002 | Miramontes | |
| 2005/0026643 A1 * | 2/2005 | White et al. | 455/550.1 |
| 2005/0124381 A1 | 6/2005 | Kim et al. | |
| 2007/0123322 A1 | 5/2007 | Mizushina | |
| 2010/0216527 A1 * | 8/2010 | Christensen et al. | 455/575.3 |

FOREIGN PATENT DOCUMENTS

| | | |
|---|---|---|
| JP | 2005-176371 A | 6/2005 |
| JP | 2007-179525 A | 7/2007 |
| WO | 03-028346 A1 | 4/2003 |

* cited by examiner

*Primary Examiner* — Duc M Nguyen
(74) *Attorney, Agent, or Firm* — Westerman, Hattori, Daniels & Adrian, LLP

(57) ABSTRACT

A mobile terminal device including a first housing, a second housing, the device having multiple configurations, including a first configuration in which the second housing is closed with respect to the first housing, a second configuration in which the second housing is slid relative to the first housing from the first configuration, and a third configuration in which the first housing is separated from the second housing, and a first input key is provided on the first housing, and is covered with the second housing in the first and second configurations and is exposed in the third configuration.

8 Claims, 16 Drawing Sheets

1 MOBILE TERMINAL DEVICE

SLIDING
HOUSING 1a    1b HOUSING

SEPARATED/COMBINED
1a    1b
INPUT KEY 1c

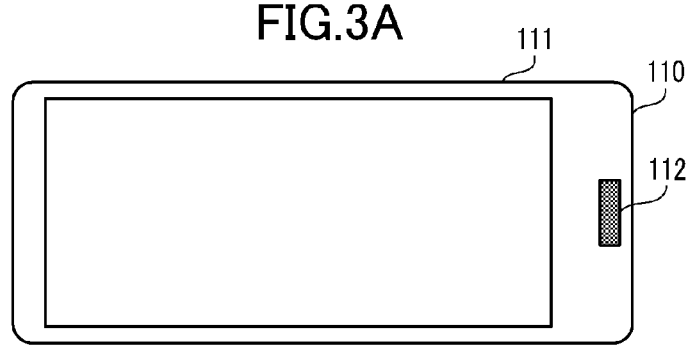
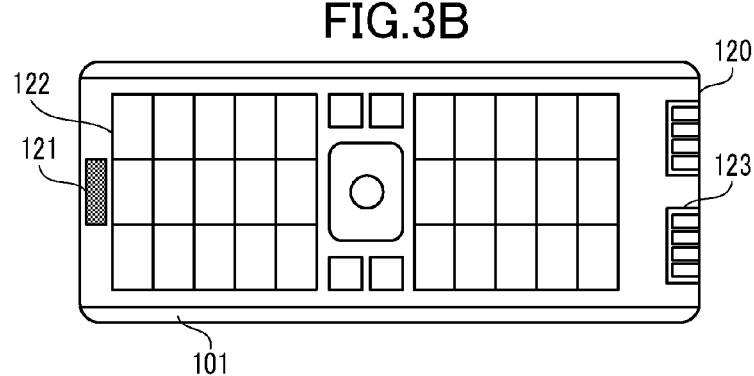
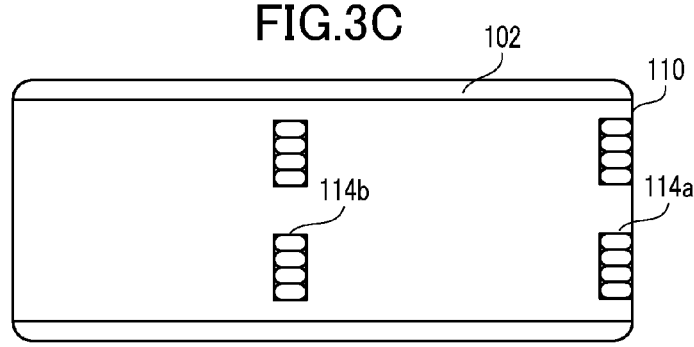
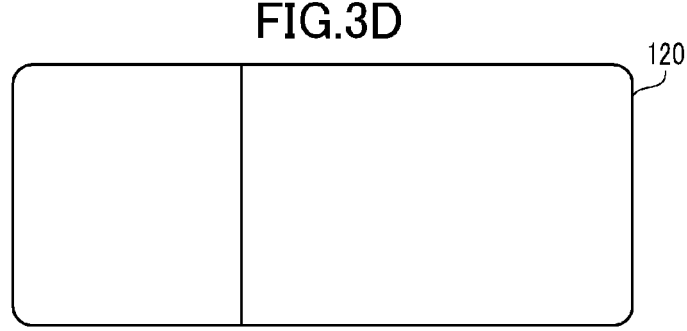

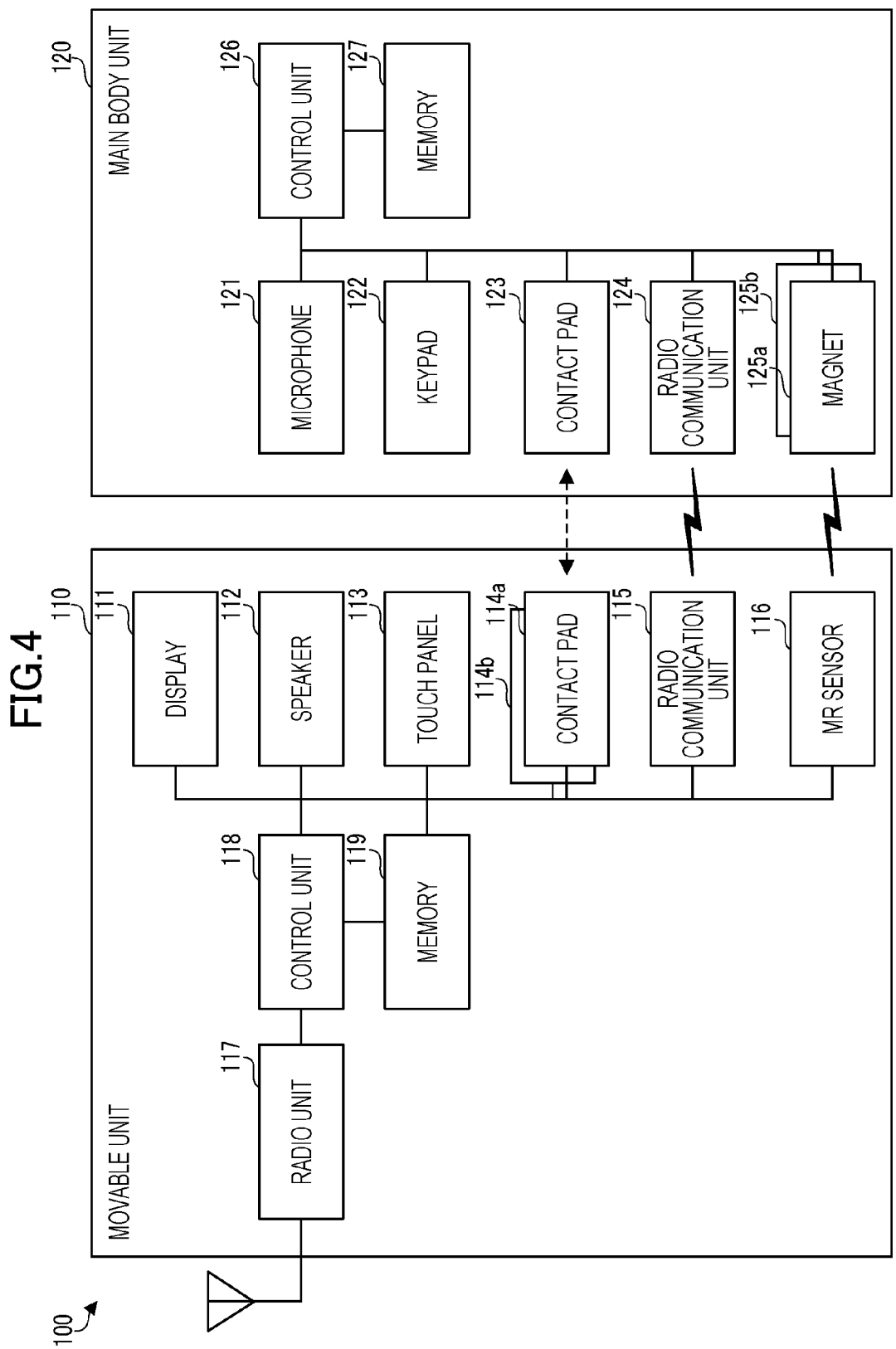

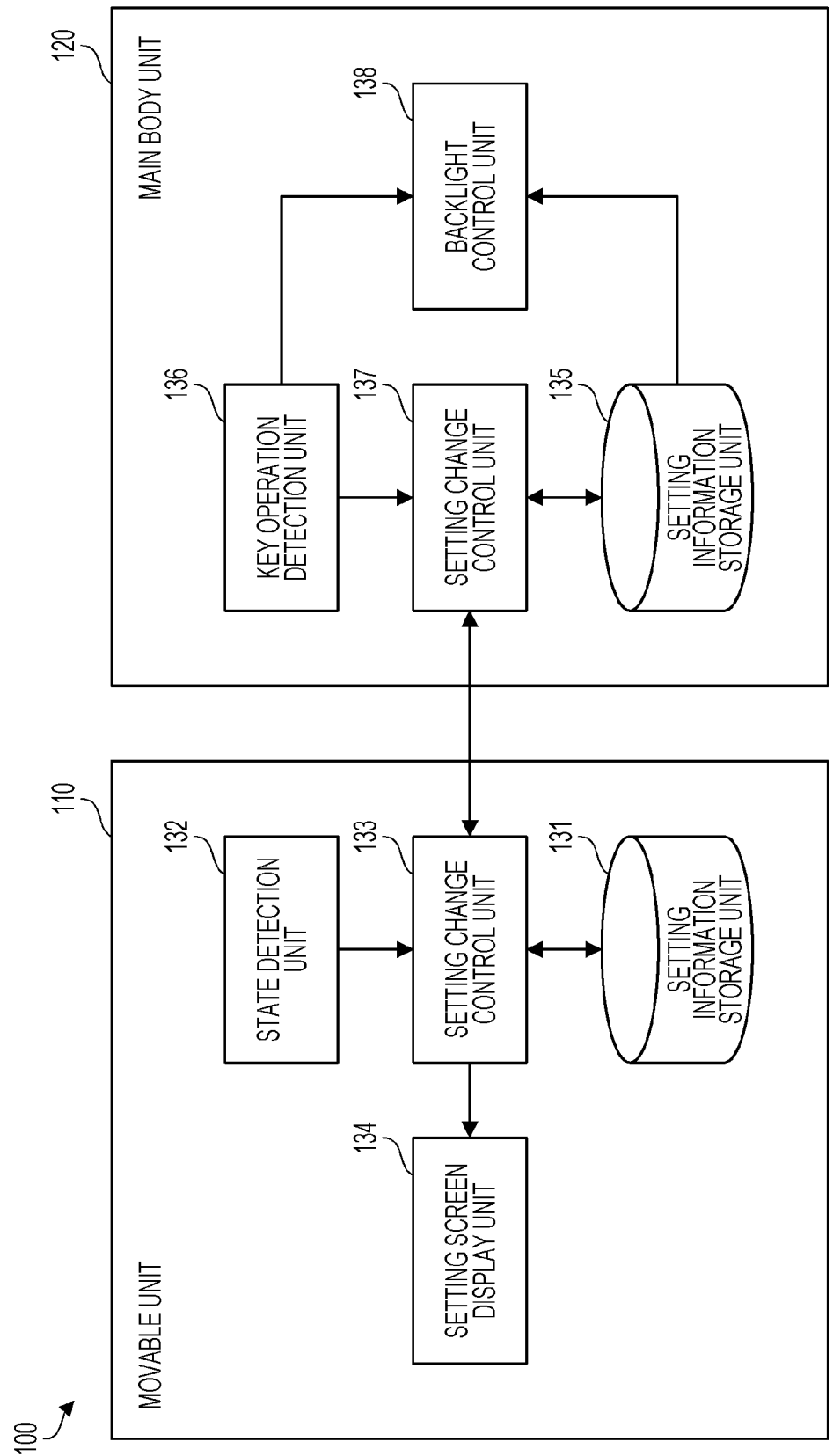

| ITEM | VALUE | REMARKS | |
|---|---|---|---|
| PRESENT | 0 | 0. POWER SAVING STATE | |
| SLIDING STATE | 1 | 1. NUMERIC KEYPAD STYLE
2. QWERTY STYLE | |
| SEPARATED STATE | 2 | 3. ENTERTAINMENT STYLE | |
| BACKLIGHT | 4 | 1. 5 SECONDS    2. 10 SECONDS    3. 15 SECONDS
4. 30 SECONDS    5. ALL TIME | |

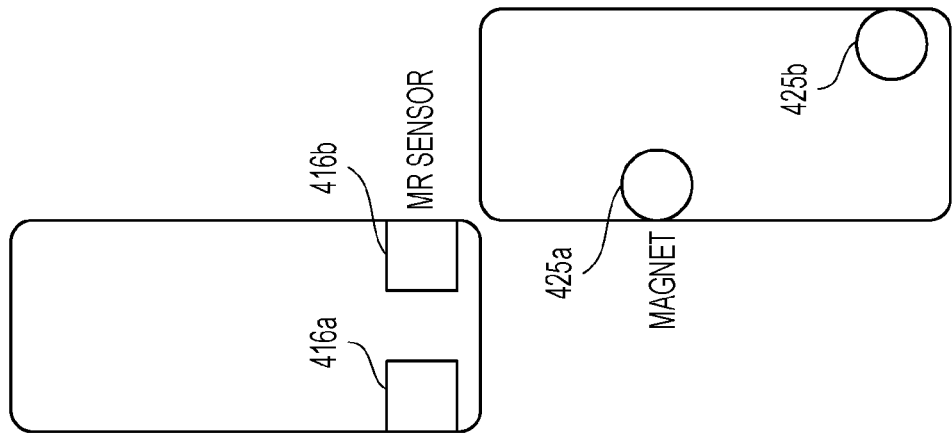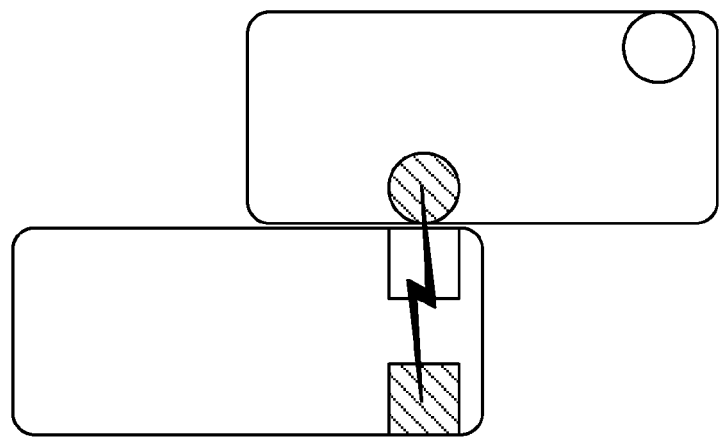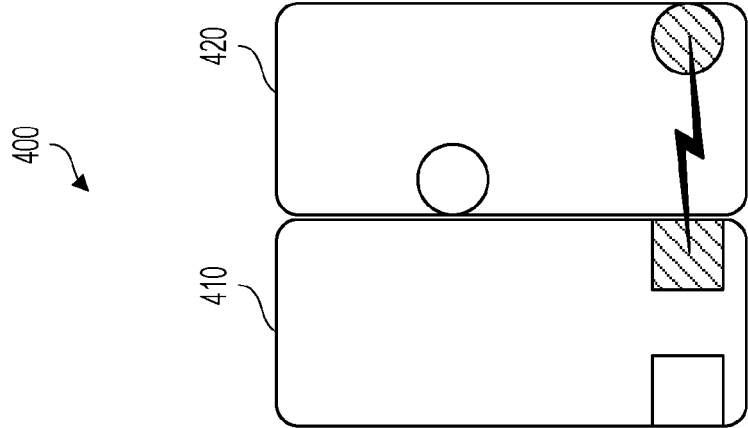

MOBILE TERMINAL DEVICE

CROSS-REFERENCE TO RELATED APPLICATIONS

This application is based upon and claims the benefit of priority from the prior Japanese Patent Application No. 2009-140145 filed on Jun. 11, 2009, the entire contents of which are incorporated herein by reference.

FIELD

The present invention relates to a mobile terminal device.

BACKGROUND

In recent years, improvement of processing ability of a mobile terminal device such as a mobile phone has resulted in multi-functionalization of a mobile phone. The mobile terminal device may perform various information processing, such as, for example, document creation, website access, e-mail transmission and reception, and moving picture reproduction. In most cases, the above-described mobile terminal device includes input keys to be used by a user to perform an input operation. For example, there is a mobile terminal device that includes a numerical keypad suitable for inputting numbers and a QWERTY keyboard suitable for inputting alphabets and other characters. The QWERTY keyboard may be called a full keyboard. In particular, the QWERTY keyboard, often used in a desk-top computer, is suitable for inputting sentences.

International Publication Pamphlet No. WO03/028346 discloses that a mobile terminal device having a keyboard. The mobile terminal device includes an extendible QWERTY keyboard on a lower layer under the numerical keypad. When the QWERTY keyboard is folded, the numerical keypad of this electronic device is exposed. Japanese Laid-Open Patent Publication No. 2007-179525 discloses that a three-stage stacked portable electronic apparatus with an upper case with a display unit, a middle case with a full keyboard, and a lower case with a numerical keypad. The full keyboard of the portable electronic apparatus is exposed when the upper case is rotated relative to the middle case. The numerical keypad of the portable electronic apparatus is exposed when the lower case is slid relative to the middle case.

A slide-type mobile terminal device, that is, a mobile terminal device with two housings e is realized by one of the housings sliding relative to the other housing. The slide-type mobile terminal device may have more than two housings. As for the above-described mobile terminal device, the input keys may be allocated in an area that is exposed when the housing is slid. However, the area that is exposed when the housing is slid is not large enough. This may decrease operability of key input. Another housing for allocating the input keys may be added. However, addition of the housing may decrease portability and operability of the mobile terminal device.

SUMMARY

According to an aspect of the invention, a mobile terminal device including a first housing, a second housing, the device having multiple configurations, including a first configuration in which the second housing is closed with respect to the first housing, a second configuration in which the second housing is slid relative to the first housing from the first configuration, and a third configuration in which the first housing is separated from the second housing, and a first input key is provided on the first housing, and is covered with the second housing in the first and second configurations and is exposed in the third configuration.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 3A-3D are diagrams illustrating an appearance of the mobile phone in a separated state according to the second embodiment, FIG. 4 is a block diagram illustrating hardware of the mobile phone according to the second embodiment, FIG. 6 is a function block diagram of the mobile phone, FIGS. 16A-16C are diagrams illustrating a state detection method according to a fifth embodiment.

DESCRIPTION OF THE EMBODIMENTS

With reference to the diagrams, description will be made below of embodiments.

First Embodiment

Figure 1A:
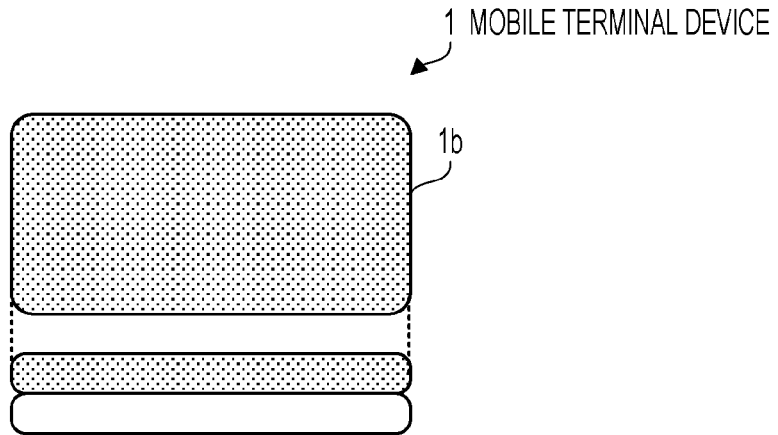
FIGS. 1A-1C are diagrams illustrating a mobile terminal device according to a first embodiment.
Figure 1B:
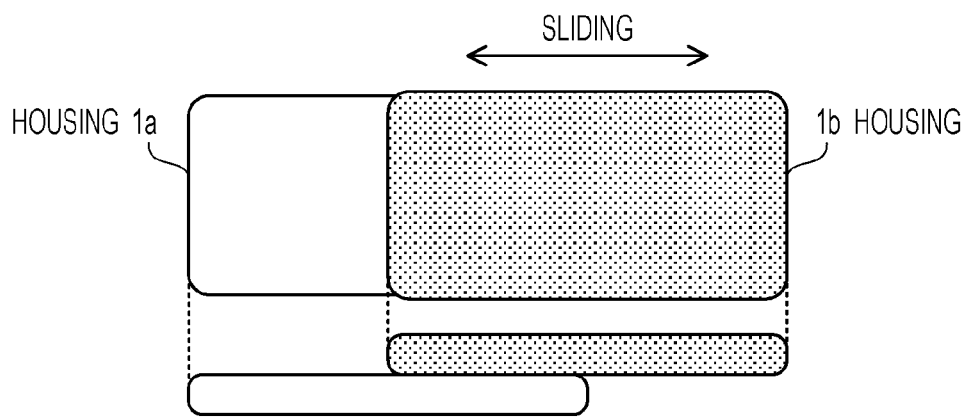
Figure 1C:
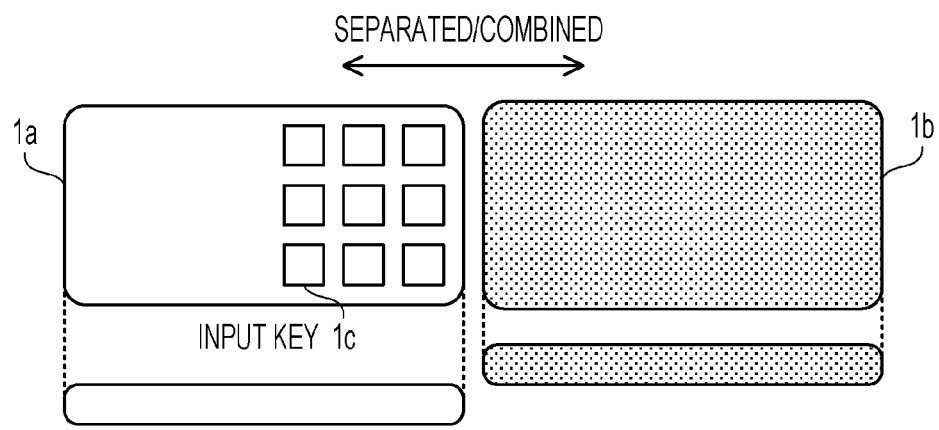

FIG. 1A to FIG. 1C are diagrams illustrating a mobile terminal device according to a first embodiment. A mobile terminal device 1 according to the first embodiment is a terminal device by which a user may perform an input operation by using an input key. The mobile terminal device 1 may be an electronic apparatus, for example, such as a mobile phone, a portable video game machine, or an electronic dictionary. The electronic apparatus may be an information processor such as a laptop computer, a Personal Digital Assistant (PDA), or the like.

The mobile terminal device 1 includes a housing 1a and a housing 1b. The housing 1a is a first housing, for example. The housing 1b is a second housing. The housing 1b is slidable relative to the housing 1a and is separable from the housing 1a. Deformed configurations that include the first, second, and third configurations are used.

In the first configuration illustrated in FIG. 1A, the housing 1a and the housing 1b are closed. That is, the housing 1a and the housing 1b are overlapped with each other in a thickness direction. The side face of the housing 1a is not required to be aligned with the side face of the housing 1b. In the second configuration illustrated in FIG. 1B, the housing 1b is slid relative to the housing 1a. Even though the housing 1b is slid in a long side direction in FIG. 1B, the housing 1b may also be slid in a short side direction. In the third configuration illustrated in FIG. 1C, the housing 1b is separated from the housing 1a. The housing 1a and the housing 1b are separable in the state after the sliding and are also directly separable in the state before the sliding.

The mobile terminal device 1 includes an input key (hereinafter referred to as "first input key") 1c. The first input key 1c may be used, for example, to input alphabets and other characters, to input numbers, to input cross directions, and to call a certain function. The first input key 1c is provided on the surface of the housing 1a facing the housing 1b side. In the first and second configurations, the first input key 1c is covered with the housing 1b and is not exposed. In the third configuration, the first input key 1c is provided in a part that is exposed. This exposed part may be called a first area, for example. The first input key 1c is not used when the housing 1b is in a housed state or a sliding state. The first input key 1c may be used when the housing 1b is in a separated state. The first area may be provided with a plurality of input keys that include the first input key 1c.

Another input key (hereinafter referred to as "second input key") may be provided in a part that is on the same face as in the first area on the surface of the housing 1a, which is covered with the housing 1b in the first configuration, and is exposed in the second and third configurations. This exposed part may be called a second area. The second input keys in the second area are not used when the housing 1b is in the housed state, and are used when the housing 1b is in the sliding state or the separated state. For example, in the second configuration, the second input keys of the second area may be used as a numerical keypad.

In the third configuration illustrated in FIG. 1C, allocation of a character group may be performed by using the first input keys of the first area and the second input keys of the second area as an integrated input key group. For example, both the first input keys of the first area and the second input keys of the second area are used to realize a keyboard by which the user is able to input 26 alphabet letters. Even in the third configuration, the first input keys of the first area and the second input keys of the second area may be used separately for different purposes. The first input keys of the first area may be used as a multi-cursor key includes cursor keys. The second input keys of the second area may be used as a numerical keypad.

The mobile terminal device 1 may control character allocation to the first and second input keys provided in the housing 1a depending on each of the deformed configurations. For example, the second input keys of the second area may be used as the numerical keypad in the second configuration, and may be used as a QWERTY key in the third configuration. If the housing 1b is deformed from the second configuration to the third configuration while a communication, for example, while a voice communication is being performed, the character allocation of the second configuration may be maintained without changing the character allocation.

The deformed configurations that include the first, second, and third configurations may be detected by, for example, a method using magnetism. In this case, a magnet may be provided to one of the housing 1a and the housing 1b, and a magnetic sensor may be provided to the other. Alternatively, the detection may be performed by determining whether or not the communication is able to be performed by a directional communication method. The directional communication method is, for example, an infrared communication.

The mobile terminal device 1 may display the characters, allocated to the first and second input keys, on the surface of the first and second input keys provided in the housing 1a. If the character allocation is not dynamically changed, there is a method, for example, for printing characters on the surface of the first and second input keys. If the character allocation is dynamically changeable, there is a method, for example, for changing characters that appear on the surface of the first and second input keys by backlight control, and a method for sliding a sheet on which the characters are printed inside the housing 1a.

If the character allocation is dynamically changeable, a display angle in the second configuration may be different from the display angle in the third configuration. In the second configuration, for example, characters are displayed, on the surface of the second input keys of the second area, in such a way that the long side direction of the mobile terminal device 1 is displayed as the vertical direction thereof. On the other hand, in the third configuration, the characters may be displayed, on the surface of the input keys of the first area and the second area, in such a way that the short side direction of the mobile terminal device 1 is displayed as the vertical direction thereof.

When the characters are displayed on the surface of the first and second input keys by the backlight control, the mobile terminal device 1 may perform electric power saving by stopping the character display of the first and second input keys in the area that is not used. For example, in the first configuration, the character display of the input keys of the first area and the second area may be stopped. In the second configuration, the character display of the first input keys in the first area may be stopped.

A control unit, which controls the character allocation to the first and second input keys and the character display, may be provided inside the housing 1a or the housing 1b. If the control unit is provided inside the housing 1b, for example, the housing 1b may perform a radio communication with the housing 1a to control the input key group that includes the first input key 1c.

The above-described mobile terminal device 1 may have deformed configurations that include the first configuration in which the housing 1b is closed relative to the housing 1a, the second configuration in which the housing 1b is slid relative to the housing 1a from the first configuration, and the third configuration in which the housing 1b is separated from the housing 1a. On the surface of the housing 1a, the first input key 1c is covered with the housing 1b in the first and second configurations and is provided in a position that is exposed in the third configuration.

In the first embodiment, the first area that is not exposed may be used as the area of the first input keys before the housing 1b is separated from the housing 1a, so that the operability of key input in the separated state is improved. In the first embodiment, if both the second area that is exposed in the sliding state and the first area that is exposed in the separated state are used as the area of the input keys, a large area may be secured for the input key group. Accordingly, in the first embodiment, a large size and a wide key pitch of each input key may be secured even when a large number of the input keys are allocated as in the QWERTY keyboard.

In the first embodiment, the character allocation to the second input keys of the second area that is exposed in the sliding is changed according to the sliding state and the separated state, so that the second input keys may be efficiently used both in the sliding state and in the separated state. In this case, the operability according to a use mode selected by the user may be improved by changing the display angle of the character that is displayed on the surface of the second input keys. The character display may be stopped independently in the second area that is exposed in the sliding state and in the first area that is exposed in the separated state, so that the electric power saving according to the deformed configuration may be realized in the first embodiment.

In the second to fifth embodiments, a mobile phone is used as an application example of the mobile terminal device 1 according to the first embodiment. As described above, the mobile terminal device 1 may be applied to various electric apparatuses other than a mobile phone.

Second Embodiment

Figure 2A:
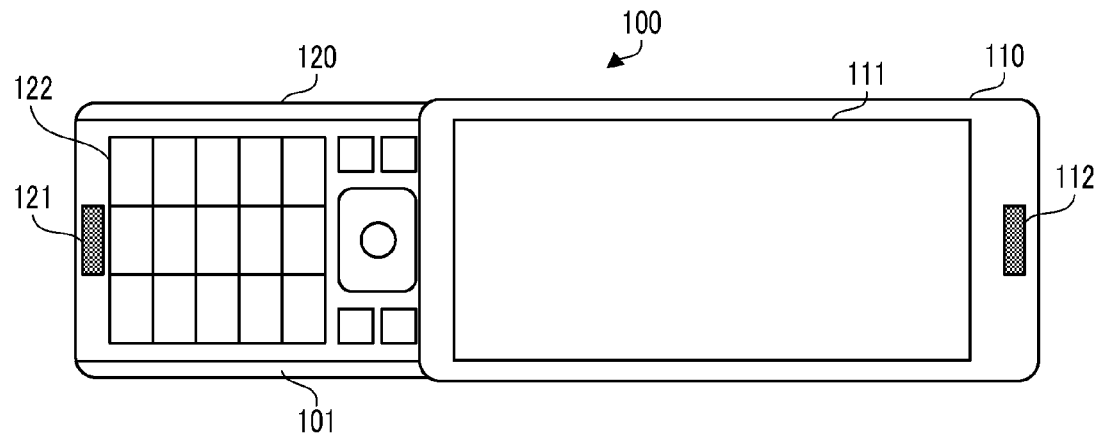
FIGS. 2A-2C are diagrams illustrating an appearance of a mobile phone according to a second embodiment.
Figure 2B:
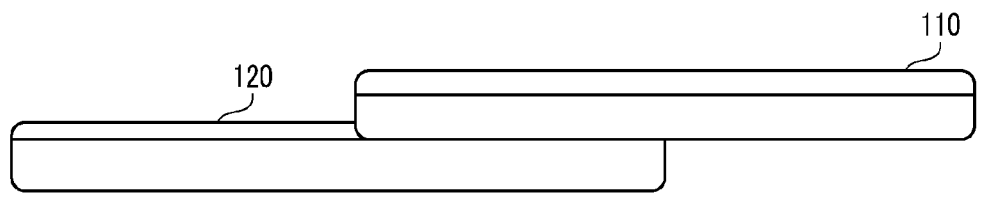
Figure 2C:
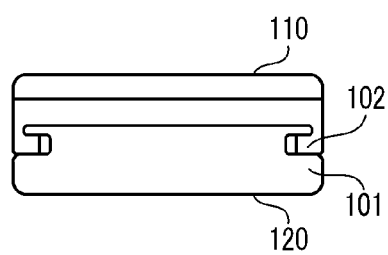

FIG. 2A to FIG. 2C are diagrams illustrating an appearance of a mobile phone according to the second embodiment. A mobile phone 100 according to the second embodiment is a mobile terminal device having a radio communication function. The mobile phone 100 includes a movable unit 110 and a main body unit 120. The movable unit 110 is an example of the housing 1b of the first embodiment. The main body unit 120 is an example of the housing 1a of the first embodiment.

The movable unit 110 overlaps the main body unit 120 on the front face of the main body unit 120. The length of the long side direction and the length of the short side direction of the movable unit 110 are substantially the same as the height and the width of the main body unit 120, respectively. The length of the long side direction of the movable unit 110 corresponds to the height of the main body unit 120, for example. The length of the short side direction of the movable unit 110 corresponds to the width of the main body unit 120, for example. When the side face of the movable unit 110 is almost aligned with the side face of the main body unit 120. This housed state may be called, for example, the first configuration. The movable unit 110 may be slid in the long side direction of the main body unit 120 and stops at a specific position. FIG. 2A and FIG. 2B illustrate the sliding state. The sliding state may be called, for example, the second configuration. In the sliding state, approximately half the height of the main body unit 120 is overlapped with the movable unit 110.

The movable unit 110 includes a display 111 and a speaker 112 on the front face thereof. The main body unit 120 includes a microphone 121 and a keypad 122 on the front face thereof. The keypad 122 includes a plurality of input keys. The keypad 122 is not exposed when covered with the movable unit 110 in the housed state. A part of the keypad 122 is exposed in the sliding state.

The main body unit 120 includes rail units 101 that have a recess on the front face thereof so that the movable unit 110 may be slid. The rail units 101 are provided at the end toward the left side face on the upper side in FIG. 2A and at the end toward the right side face on the lower side in FIG. 2A along the sliding direction. The movable unit 110 includes frame units 102 that are protruded to the back face thereof. As with the rail units 101, the frame units 102 are provided at the end toward the left side face and at the end of the right side face along the sliding direction. FIG. 2C illustrates a sectional view of the mobile phone 100 of FIG. 2A. Since the rail units 101 are engaged with the frame units 102, the movable unit 110 is able to be slid.

The movable unit 110 may be slid in the long side direction in the example illustrated in FIG. 2A and FIG. 2B. The movable unit 110 may also be slid in the short side direction. In this case, rail units and frame units may be provided toward the bottom face on the left side in FIG. 2A and toward the upper side on the right side in FIG. 2A. The movable unit 110 may be slid both in the long side direction and in the short side direction. In this case, both the rail units and the frame units for sliding in the long side direction and the rail units and the frame units for sliding in the short side direction may be provided.

FIG. 3A to FIG. 3D are diagrams illustrating an appearance of a mobile phone in the separated state according to the second embodiment. By sliding the movable unit 110 relative to the main body unit 120 to separate the movable unit 110 from the main body unit 120, the state of the mobile phone may be deformed to the separated state as a third state from the sliding state illustrated in FIG. 2B. Alternatively, the state of the mobile phone may also be directly deformed to the separated state from the housed state.

As illustrated in FIG. 3C, the movable unit 110 includes contact pads 114a and 114b on the back face thereof. The contact pads 114a and 114b are provided with connection terminals to perform a contact communication with the main body unit 120. The contact communication corresponds to, for example, a non-radio communication. The contact pad 114a is provided at the end toward the top face on the right side in FIG. 3A. The contact pad 114b is provided near the middle of the long side direction. The main body unit 120 includes a contact pad 123 on the front face thereof. The contact pad 123 includes the connection terminal to perform the contact communication with the movable unit 110. The contact pad 123 is provided at the end toward the top face.

If the connection terminal of the contact pad 114a contacts with the connection terminal of the contact pad 123, a communication may be performed by applying a current between the connection terminals thereof. If the connection terminal of the contact pad 114b contacts with the connection terminal of the contact pad 123, the communication may be performed by applying the current between the connection terminals thereof. The whole keypad 122 is exposed in the separated state.

FIG. 4 is a block diagram illustrating hardware of a mobile phone according to the second embodiment. The mobile phone 100 according to the second embodiment includes the movable unit 110 and the main body unit 120. The movable unit 110 and the main body unit 120 may perform the contact communication or the non-directional radio communication by various controls that include a control of the input keys.

The movable unit 110 includes the display 111, the speaker 112, and the contact pads 114a and 114b. The movable unit 110 further includes a touch panel 113, a radio communication unit 115, an MR sensor 116, a radio unit 117, a control unit 118, and a memory 119.

The display 111 displays various images according to the control of the control unit 118. For example, a liquid crystal display or an organic Electro Luminescence (EL) display may be used as the display 111. The display 111 is positioned in a lower layer under the touch panel 113, and a displayed image penetrates the touch panel 113 and is visible from the front face of the display 111. The displayed image may be, for example, a standby screen, an operation screen, a text, a content image, or the like.

The speaker 112 converts an electric signal into a physical vibration to reproduce a voice according to the control of the control unit 118. For example, when the user is having a conversation, voice of the conversation partner or background noise on the partner side are output from the speaker 112.

The touch panel 113 detects a touch operation of the user and outputs the touched position as an input signal to the control unit 118. The touch operation is performed by a pointing device such as a touch pen or a user's finger. The user may perform the touch operation on the touch panel 113 while looking at an image displayed on the display 111. Various methods, such as a matrix switch method, a resistance film method, a surface acoustic wave method, an infrared ray method, an electromagnetic induction method, an electrostatic capacitance method or the like may be used to detect the touch position. Any of the above-described methods may be used.

The contact pads 114a and 114b include the connection terminals to perform the contact communication with the main body unit 120. The contact pad 114a and the contact pad 114b are provided in different positions on the back face of the movable unit 110 so that the contact communication may be performed either in the housed state or in the sliding state. It is preferable that the connection terminals are slightly protruded from the face on which the contact pads 114a and 114b are provided so that the connection terminal may easily contact with the contact terminal of the main body unit 120. While being in contact with the contact pad 123, the contact pads 114a and 114b perform the communication according to the control of the control unit 118.

The radio communication unit 115 performs the radio communication with the main body unit 120 according to the control of the control unit 118. The radio communication unit 115 uses a non-directional radio communication method. For example, communication methods such as BLUETOOTH (trademark), ZIGBEE (trademark), Wireless Universal Serial Bus (USB), a Local Area Network (LAN), or the like may be used.

The MR sensor 116 detects a change of a magnetic field by using a Magneto Resistive (MR) element and reports the detection result to the control unit 118. The MR sensor 116 detects the magnetic field of the magnet provided in the main body unit 120. This enables the control unit 118 to determine whether or not the movable unit 110 is separated from the main body unit 120.

The radio unit 117 performs radio signal processing according to the control of the control unit 118 and performs the radio communication with another communication device such as a radio base station. Specifically, the radio unit 117 demodulates and decodes a signal received through an antenna mounted on the movable unit 110 and outputs the obtained reception data to the control unit 118. The radio unit 117 encodes and modulates transmission data obtained from the control unit 118 and outputs the obtained transmission signal through the antenna. The data transmitted and received to and from the radio unit 117 is voice data, image data, text data, or control information.

The control unit 118 controls the whole mobile phone 100. The control unit 118 includes, for example, a Central Processing Unit (CPU) and a Random Access Memory (RAM). The CPU reads out programs and data from the memory 119 and develops the programs and the data in the RAM to perform the programs. The RAM is a volatile memory that temporally stores at least some of the programs and part of the data. In the second embodiment, other types of memory may be used instead of the RAM. The control of the control unit 118 is communication control, voice input/output control, key operation control, or the like.

The memory 119 is a volatile memory that stores the program and the data used by the control unit 118. A flash memory, for example, may be used as the memory 119. The control unit 118 reads out the programs and the data stored in the memory 119 and writes the data into the memory 119.

In addition to the above-described microphone 121, keypad 122, and contact pad 123, the main body unit 120 includes a radio communication unit 124, magnets 125a and 125b, a control unit 126, and a memory 127.

The microphone 121 receives a voice input by converting the physical vibration of the voice into an electric signal. The received electric signal is output to the control unit 118 via the control unit 126. For example, while the user is having a conversation, the user's voice and the background noise on the user side are input from the microphone 121.

The keypad 122 includes a plurality of input keys. It is preferable that the keypad 122 includes 26 input keys (26 alphabet letters) or more to function as the QWERTY keyboard. When any one of the input keys is pressed, the keypad 122 outputs the input signal indicating the pressed input key to the control unit 118 via the control unit 126.

The character allocation to the input keys may be dynamically changed by the control unit 126. The character allocation may be controlled separately in the area that is not be exposed in the sliding state and is exposed in the separated state, and in the area that is not exposed in the housed state and is exposed in the sliding state. The former area may be called a first area. The latter area may be called a second area. At least two patterns of the character allocation may be performed on the first area and the second area, respectively.

The keypad 122 includes a backlight. As with the character allocation, turn-on and turn-off of the backlight may be controlled in the first area and the second area, separately. The electric power saving may be performed in the area that is not exposed by turning off the backlight. If the character allocation is changed, the characters that are displayed or appear on the surface of the input key are changed. For example, there is a method for providing a Light Emitting Diode (LED) in a plurality of colors as the backlight and for allowing the characters to appear in each color of the LED. In this method, the characters are not displayed when the backlight is turned off. This state may be called a flank state. As described in the first embodiment, a display changing method may be used by sliding the sheet.

The contact pad 123 includes the connection terminal to perform the contact communication with the movable unit 110. While being in contact with the contact pad 114a or the contact pad 114b, the contact pad 123 performs the communication according to the control of the control unit 126.

The radio communication unit 124 performs the radio communication with the movable unit 110 according to the control of the control unit 126. As with the radio communication unit 115, the radio communication unit 124 uses the non-directional radio communication method. For example, the communication method such as BLUETOOTH, ZIGBEE, Wireless USB, wireless LAN, or the like may be used.

The magnets 125a and 125b are a magnetic body that generates a magnetic field. The magnet 125a and the magnet 125b are provided in different positions inside the main body unit 120 so that the MR sensor 116 may detect the magnetic filed in either the housed state or the sliding state.

The control unit 126 controls the operation on the main body unit 120 side based on the control of the control unit 118. As with the control unit 118, the control unit 126 may be realized by the CPU and the RAM. The CPU reads out the program and the data from the memory 127 and develops the programs and the data in the RAM to perform the programs. The RAM is a volatile memory that temporally stores at least some of the programs and part of the data. Other types of memory may be used instead of the RAM. The control of the control unit 126 may be communication control, voice input control, key operation control, or the like.

The memory 127 is a volatile memory that stores the programs and the data used by the control unit 126. For example, a flash memory may be used as the memory 127. The control unit 126 reads out the programs and the data stored in the memory 127 and writes the data in the memory 127.

As illustrated in FIG. 4, the mobile phone 100 according to the second embodiment has the communication function through a base station on the movable unit 110 side where the display 111 is provided. It is an advantage that a band according to a data size is not required to be secured between the movable unit 110 and the main body unit 120 even when large size data such as moving image data is received from the base station and is displayed. If a communication band between the movable unit 110 and the main body unit 120 is large enough, the communication function through the base station may be provided on the main body unit 120 side.

Processing ability of the control unit 126 of the main body unit 120 is not required to be the same as the processing ability of the control unit 118 of the movable unit 110. For example, calculation ability of the CPU of the control unit 126 may be lower than the calculation ability of the CPU of the control unit 118. In FIG. 4, the movable unit 110 is provided with two contact pads: the contact pad 114a and the contact pad 114b, and the main body unit 120 is provided with a single contact pad: the contact pad 123. The numbers of the contact pads may be reversed. The movable unit 110 is provided with the MR sensor 116, and the main body unit 120 is provided with the magnets 125a and 125b. The position of the MR sensor 116 and the position of the magnets 125a and 125b may be reversed.

As for the mobile phone 100 according to the second embodiment, the movable unit 110 and the main body unit 120 perform the contact communication in the housed state and the sliding state, and may also perform the communication by a directional radio communication method. Radio ports may be provided instead of the contact pads 114a, 114b, and 123. For example, a communication method of infrared communication or Radio Frequency Identification (RFID) may be used as the directional radio communication method.

Figure 5A:
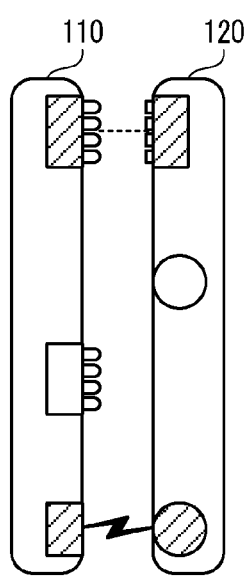
FIGS. 5A-5C are diagrams illustrating a state detection method by using a magnet.
Figure 5B:
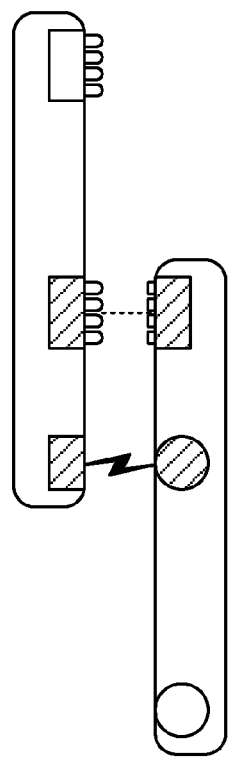
Figure 5C:
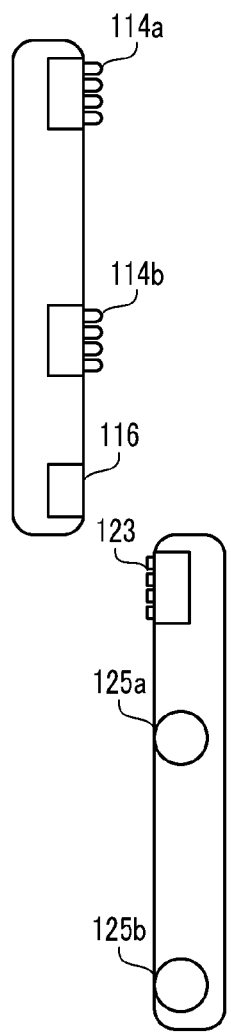

FIG. 5A to FIG. 5C are diagrams illustrating a state detection method using a magnet. FIG. 5A to FIG. 5C illustrate states of the mobile phone 100 viewed from the right side face on the lower side in FIG. 3A. In the housed state illustrated in FIG. 5A, the whole back face of the movable unit 110 is placed opposite to the whole front face of the main body unit 120. In the sliding state illustrated in FIG. 5B, a part of the back face of the movable unit 110 is placed opposite to a part of the front face of the main body unit 120. In the separated state illustrated in FIG. 5C, the whole front face of the main body unit 120 is exposed.

In the housed state illustrated in FIG. 5A, the contact pad 114a of the movable unit 110 and the contact pad 123 of the main body unit 120 are placed opposite and in contact with each other. Consequently, the movable unit 110 and the main body unit 120 may perform the contact communication through the contact pads 114a and 123. In the housed state, the MR sensor 116 of the movable unit 110 is placed opposite to the magnet 125b of the main body unit 120. Consequently, the MR sensor 116 detects the magnetic field of the magnet 125b. This determines that the movable unit 110 is not separated from the main body unit 120.

In the sliding state illustrated in FIG. 5B, the contact pad 114b and the contact pad 123 of the movable unit 110 are placed opposite and in contact with each other. Accordingly, the movable unit 110 and the main body unit 120 are able to perform the contact communication through the contact pads 114b and 123. In the sliding state, the MR sensor 116 of the movable unit 110 is placed opposite to the magnet 125a of the main body unit 120. Consequently, the MR sensor 116 detects the magnetic field of the magnet 125a. This determines that the movable unit 110 is not separated from the main body unit 120.

In the separated state illustrated in FIG. 5C, neither the contact pad 114a nor the contact pad 114b of the movable unit 110 is in contact with the contact pad 123 of the main body unit 120. Accordingly, the contact communication is not performed between the movable unit 110 and the main body unit 120. In the separated state, the MR sensor 116 of the movable unit 110 is not placed opposite to the magnet 125a or the magnet 125b of the main body unit 120. Accordingly, the MR sensor 116 does not detect the magnetic field. This determines that the movable unit 110 is separated from the main body unit 120.

The housed state is distinguished from the sliding state depending on whether communication is performed with the contact pad 114a or the contact pad 114b. As described above, instead of the contact pads 114a, 114b, and 123, if radio ports such as infrared ports, for example, are provided, the determination may be performed depending on which radio port detects a radio signal.

FIG. 6 is a functional block diagram of a mobile phone. Since the movable unit 110 and the main body unit 120 execute the program, respectively, the mobile phone 100 realizes the functions. All or some of the functions may be realized by a specific hardware circuit. In FIG. 6, description of the functions other than the input key control is omitted. For example, the description of the communication function through the base station is omitted.

If the control unit 118 executes the program stored in the memory 119, a setting information storage unit 131, a state detection unit 132, a setting change control unit 133, and a setting screen display unit 134 are realized in movable unit 110.

The setting information storage unit 131 stores setting information. A storage area as the setting information storage unit 131 is secured on the RAM if, for example, the CPU executes the program. The setting information includes information that is used to control the keypad 122. Specifically, the character allocation currently used, the character allocation used in the sliding state and the separated state, a turn-off timing of the backlight are defined by the setting information. Contents of the setting information may be defined by the user.

The state detection unit 132 detects whether the present state of the movable unit 110 is the housed state, the sliding state, or the separated state. Specifically, the state detection unit 132 distinguishes the separated state from other states based on the detection state of the MR sensor 116. The state detection unit 132 distinguishes the housed state from the sliding state based on a contact state of the contact pads 114a and 114b. If the present state is changed, the state detection unit 132 reports the change to the setting change control unit 133.

The setting change control unit 133 controls setting change of the keypad 122. Specifically, the setting change control unit 133 instructs the setting screen display unit 134 to display a setting screen and prompts the user to set the character allocation method. When the user performs input with respect to the setting screen, the setting change control unit 133 updates the setting information, stored in the setting information storage unit 131, according to the input content. The setting change control unit 133 updates the setting information stored in the setting information storage unit 131 even when receiving the report of the state change from the state detection unit 132 and when receiving the report of the setting change from the main body unit 120.

The setting information storage unit 131 sends a report to the main body unit 120 to reflect the setting change if the setting information stored in the setting information storage unit 131 is updated depending on determination of the movable unit 110. Reporting the setting change is performed by the contact communication in the housed state and in the sliding state and is performed by the radio communication in the separated state. In response to the instruction from the setting change control unit 133, the setting screen display unit 134 displays the setting screen on the display 111. On the setting screen, the character allocation used in the sliding state, the character allocation used in the separated state, the turn-off timing of the backlight, or the like may be selected.

If the control unit 126 executes the program stored in the memory 127, a setting information storage unit 135, a key operation detection unit 136, a setting change control unit 137, and a backlight control unit 138 are realized in the main body unit 120.

The setting information storage unit 135 stores the same setting information as of the setting information storage unit 131 of the movable unit 110. That is, the setting information includes the character allocation that is currently used, the character allocation used in the sliding state and the separated state, the turn-off timing of the backlight, and the information that is used to control the keypad 122. The storage area as the setting information storage unit 135 is secured on the RAM if, for example, the CPU executes the program.

The key operation detection unit 136 detects a press of the input key of the keypad 122 and reports the detection to the backlight control unit 138. If the key operation detection unit 136 detects a prescribed key operation indicating the change of the character allocation and reports the detection to the setting change control unit 137. For example, the prescribed key operation may be an operation for pressing a certain input key for a fixed time or longer. The user may manually change the character allocation to the input keys by performing the above-described key operation.

The setting change control unit 137 controls the setting change of the keypad 122. Specifically, when receiving the report of the setting change from the setting change control unit 133 of the movable unit 110, the setting change control unit 137 updates the setting information stored in the setting information storage unit 135 according to the report content. The setting information on the movable unit 110 side is synchronized with the setting information on the main body unit 120 side. When receiving the report from the key operation detection unit 136, the setting change control unit 137 updates the setting information stored in the setting information storage unit 135 and sends a report to the movable unit 110 to reflect the setting change.

Based on the pressing state of the input key reported from the key operation detection unit 136 and the setting information stored in the setting information storage unit 135, the backlight control unit 138 controls the backlight of the keypad 122. Specifically, the backlight control unit 138 performs the character allocation to the input keys based on the setting information. The backlight control unit 138 turns off the backlight of the area in which the character allocation is not performed. If a time that is defined by the setting information passes after the input key is pressed for the last time, the backlight of the area in which the character allocation is performed is turned off. After that, if the input key is pressed, the backlight of the area in which the character allocation is performed is turned on again.

Figure 7:
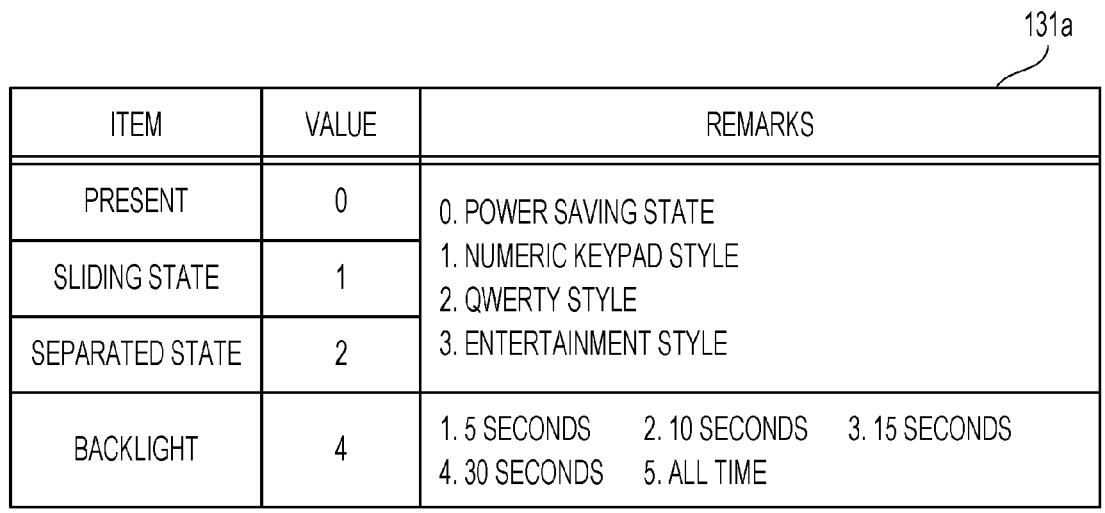
FIG. 7 is a diagram illustrating a data structure of setting information.

FIG. 7 is a diagram illustrating a data structure of the setting information. The setting information table 131a illustrated in FIG. 7 is stored in the setting information storage unit 131 of the movable unit 110. The same table is stored also in the setting information storage unit 135 of the main body unit 120. Even though the setting information is expressed in a table format in FIG. 7, the setting information may be expressed in another data format such as eXtensible Markup Language (XML) or Comma Separated Values (CSV).

The setting information table 131a has an item column for indicating a setting item name, a value column for indicating a set value, and a remarks column for indicating a meaning of the set value. In the value column, the number value that is defined in the remarks column is set. In the setting item of "Present," the character allocation of the present input key is defined. In the setting item of "Sliding State," the character allocation method, which is automatically used in the sliding state, is defined. In the setting item of "Separated State," the character allocation method, which is manually used in the separated state, is defined. In the setting item of "Backlight," a waiting time from the time when the input key is pressed for the last time to the time when the backlight is automatically turned off is defined.

The character allocation method is selected from among, for example, an electric power saving state, a numerical keypad style, a QWERTY style, and an entertainment style. In the power saving state, both the first area that is exposed in the separated state and the second area that is exposed in the sliding state are turned off. In the numerical keypad style, the first area is turned off, and the numerical keypad is realized in the second area. In the QWERTY style, the QWERTY keyboard in the first and second areas. In the entertainment style, a keyboard with a key arrangement that is different from the key arrangement of the QWERTY keyboard is realized.

If the lighting-off timing of the backlight is selected from among, "5 seconds," "10 seconds," "15 seconds," "30 seconds," and "All time," for example. If the turn-off timing "All time" is selected, automatic turn-off of the backlight is not performed. The setting items other than the setting item "Present" may be arbitrarily set by the user. The setting screen display unit 134 provides the setting screen on which any one from the selections displayed in the remarks column for "Sliding State," "Separated State," and "Backlight," respectively. As described above, if the movable unit 110 is slidable both in the long side direction and in the short side direction, the character allocation may be set for longitudinal sliding and lateral sliding, respectively.

Figure 8A:
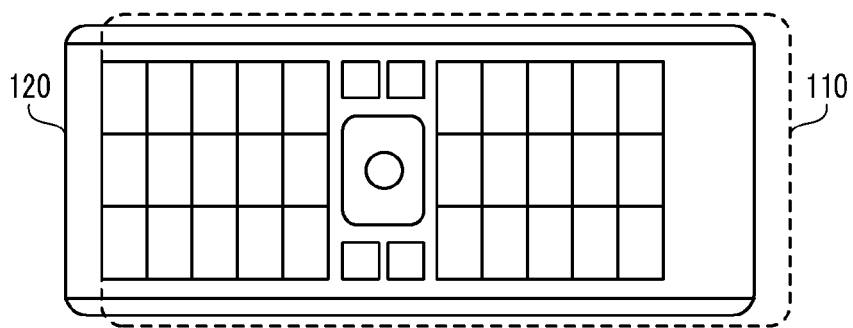
FIGS. 8A and 8B are a first diagram illustrating a key allocation style.
Figure 8B:
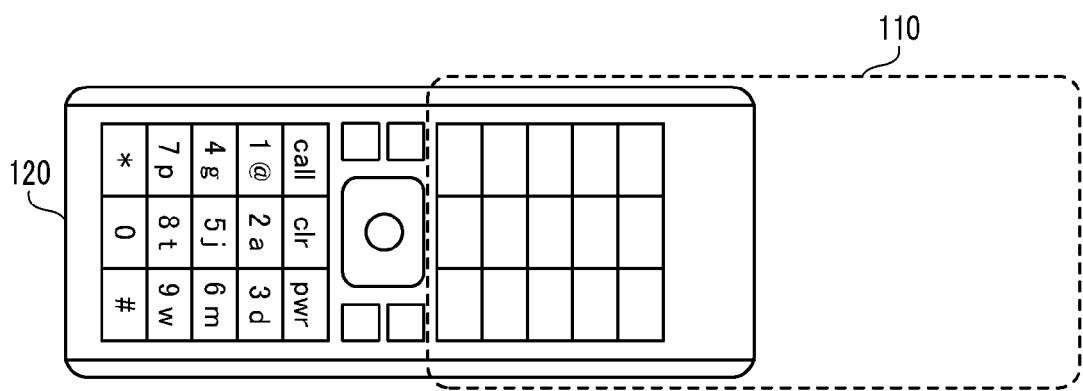

FIG. 8A and FIG. 8B are a first diagram illustrating a key allocation style. In the example of FIG. 8A, the keypad 122 includes 15 input keys toward the top face on the right side in FIG. 8A in the main body unit 120 and includes the input keys as arrow keys and the input key for function call near the center thereof. The keypad 122 includes 15 input keys toward the bottom face on the left side of FIG. 8B in the main body unit 120. FIG. 8A illustrates an electric power saving state. FIG. 8B illustrates a numerical keypad style.

In the power saving state illustrated in FIG. 8A, the character allocation is not performed both on the input keys toward the top face and on the input keys toward the bottom face, so that the character is not displayed on the surface of the input keys. When the movable state 110 is in the housed state, it is preferable that the keypad 122 is in the electric power saving state. In the housed state, the input key is displayed on the display 111, and the user may perform character input by performing the touch operation with respect to the touch panel 113 instead of using the keypad 122.

In the numerical keypad style illustrated in FIG. 8B, the characters to be used as the numerical keypad are allocated to the input keys toward the bottom face. The allocated characters are displayed in such a way that the long side direction of the main body unit 120 is the vertical direction of the characters. The character allocation is not performed on the input keys toward the top face, so that the characters are not displayed on the surface of the input keys. When the movable unit 110 is in the sliding state, it is preferable that the keypad 122 is in the numerical keypad style.

Figure 9A:
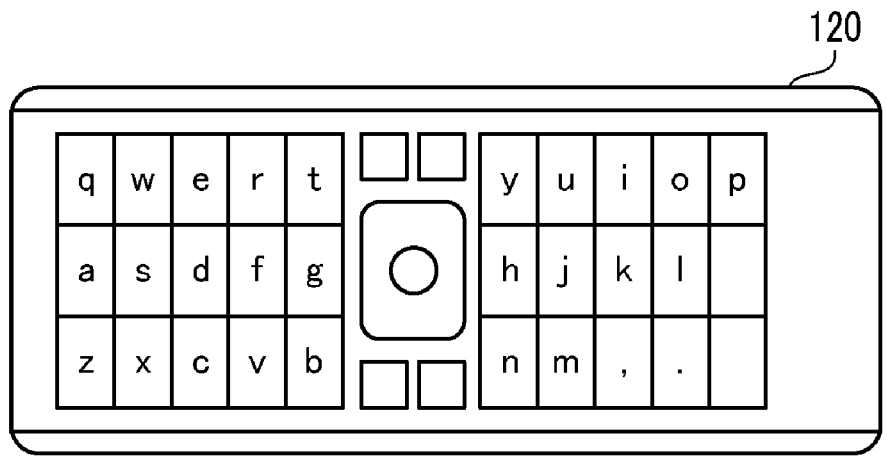
FIGS. 9A and 9B are a second diagram illustrating the key allocation style.
Figure 9B:
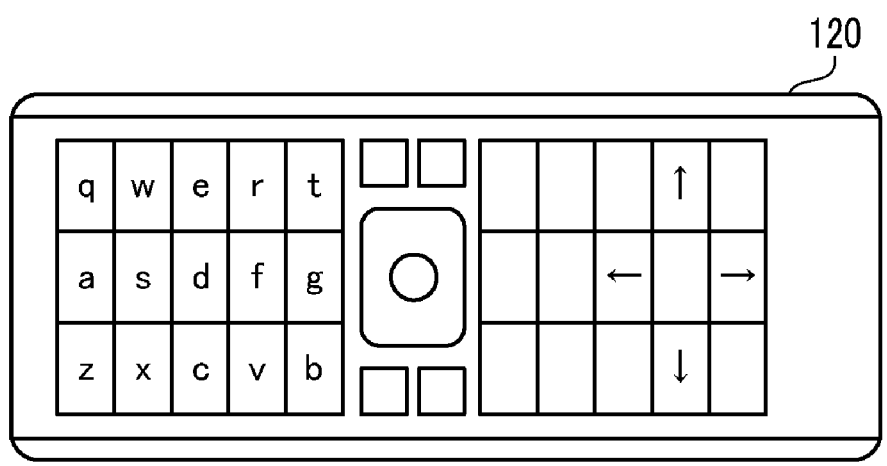

FIG. 9A and FIG. 9B are second diagrams illustrating a key allocation style. In the example illustrated in FIG. 9A, in the same manner as in FIG. 8A, the keypad 122 includes 15 input keys toward the top face of the main body unit 120 and includes 15 input keys toward the bottom face of the main body unit 120. FIG. 9A illustrates the QWERTY style. FIG. 9B illustrates the entertainment style.

In the QWERTY style illustrated in FIG. 9A, both the input keys toward the top face and the input keys toward the bottom face are considered as one input key group, and the characters to be used as the QWERTY keyboard are allocated. The allocated characters are displayed such a way that the short side direction of the main body unit 120 is the vertical direction of the character. If the user performs sentence input when the movable unit 110 is in the separated state, it is preferable that the keypad 122 is in the QWERTY style.

In the entertainment style illustrated in FIG. 9B, the characters are allocated both to the input keys toward the top face and to the input keys toward the bottom face. In the example illustrated in FIG. 9B, signs for upper/lower and right/left are allocated to the input keys toward the top face, and the same characters as in the QWERTY style are allocated to the input keys toward the bottom face. In the same manner as in the QWERTY style, the allocated characters are displayed in such a way that the short side direction of the main body unit 120 is the vertical direction of the characters. When the movable unit 110 is in the separated state and the user performs operations such as playing games and viewing moving pictures other than inputting sentences, it is preferable that the keypad 122 is in the entertainment style.

In the example of the keypad 122 illustrated in FIG. 8A and FIG. 9A, the input keys as the arrow keys and the input key for function call are provided in the center thereof. Accordingly, in the QWERTY style, the user easily recognizes a home position of fingers. This is an advantage that touch typing becomes easier.

In the example of the entertainment style illustrated in FIG. 9B, the same characters as in the QWERTY style are allocated to the input keys toward the bottom face. The application software such as games or moving image viewing software may use an input key such as Z or X as a shortcut key. The character allocation and the character display illustrated in FIG. 8A, FIG. 8B, FIG. 9A and FIG. 9B are examples, and other examples may be used. For example, in the entertainment style, the characters that are used as the numerical keypad may be allocated to the input keys toward the bottom face.

Figure 10:
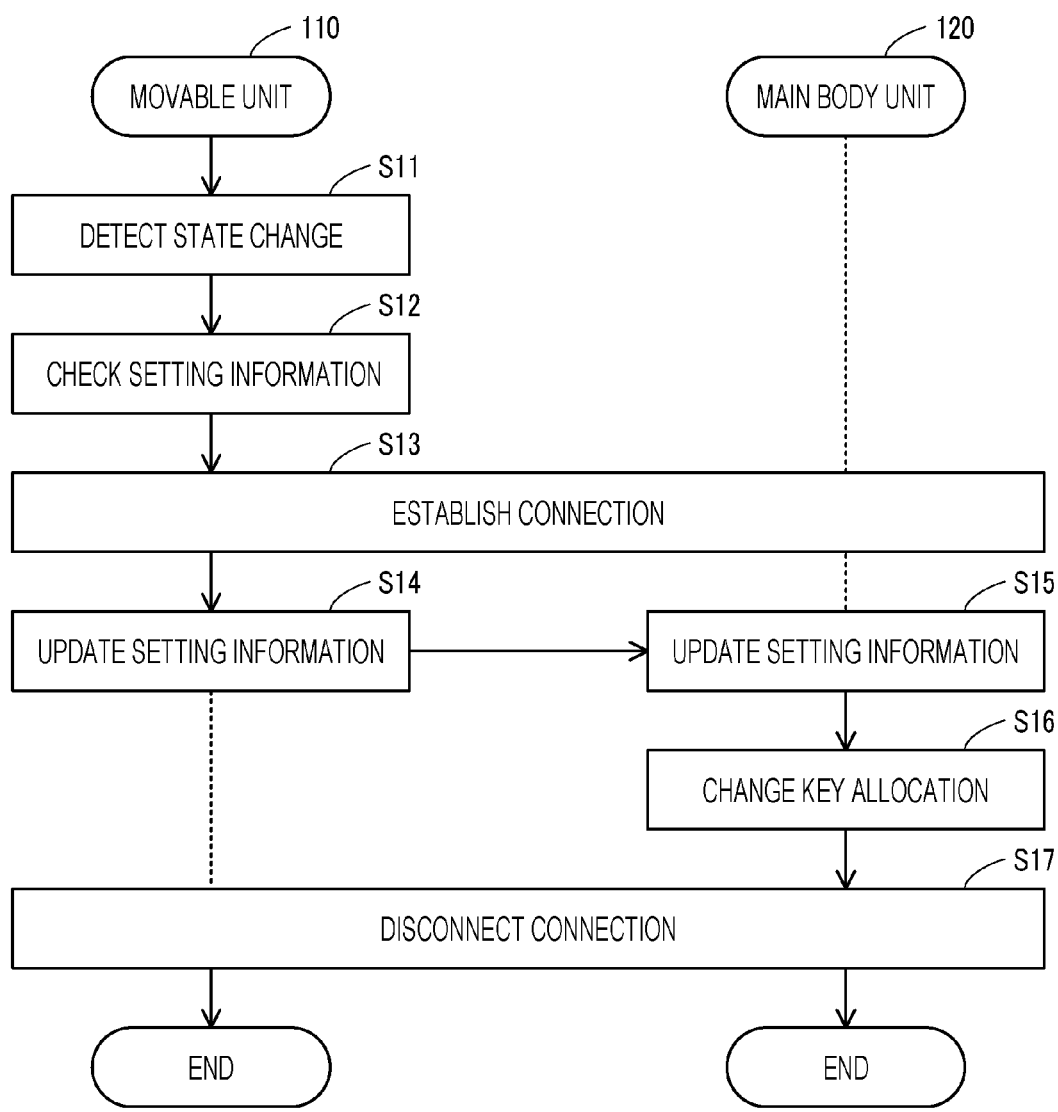
FIG. 10 is a first flowchart illustrating key allocation control.

FIG. 10 is a first flowchart illustrating key allocation control. This flowchart illustrates an automatic change of the character allocation according to the state change of the movable unit 110. Description will be made below of control processing illustrated in FIG. 10 according to the operation numbers.

(Operation S11) The state detection unit 132 detects the state change of the movable unit 110 based on the detection state of the MR sensor 116 and the contact state of the contact pads 114a and 114b. For example, the state detection unit 132 detects a change from the housed state to the sliding state and a change from the sliding state to the separated state.

(Operation S12) The setting change control unit 133 checks the setting information stored in the setting information storage unit 131 to specify the character allocation method corresponding to the state of the movable unit 110 after the change of the state. For example, the setting change control unit 133 specifies the electric power saving state, the numerical keypad style, the QWERTY style, or the entertainment style.

(Operation S13) The setting change control unit 133 sends a connection request to the setting change control unit 137 and establishes a connection between the setting change control unit 133 and the setting change control unit 137. The connection is established by the contact communication or the non-directional radio communication according to the changed state of the present movable unit 110.

(Operation S14) Based on the character allocation method specified in Operation S12, the setting change control unit 133 updates the information indicating the present allocation method from among the information stored in the setting information storage unit 131. The setting change control unit 133 uses the connection established in Operation S13 to instruct the setting change control unit 137 to perform the setting change. At that time, the allocation method after the change may be reported, or the changed state of the movable unit 110 may be reported.

(Operation S15) Based on the instruction from the setting change control unit 133, the setting change control unit 137 updates the information indicating the present character allocation method from among the setting information stored in the setting information storage unit 135.

(Operation S16) Based on the setting information updated in Operation S15, the backlight control unit 138 performs the change of the character allocation to the input keys, that is, the control of turn-on and turn-off of the backlight of the keypad 122. For example, as for each of the backlight of the area that is exposed in the sliding state and the backlight of the area that is exposed in the separated state, the control determines which color LED is conducted or whether or not all the LED are nonconductive to switch from/to conduction or non-conduction.

(Operation S17) The setting change control unit 137 reports change completion of the character allocation to the setting change control unit 133. The setting change control unit 133 sends a disconnection request to the setting change control unit 137 and disconnects the connection between the setting change control unit 133 and the setting change control unit 137.

In this manner, if the movable unit 110 detects the state change, the movable unit 110 instructs the main body unit 120 in such a way that the keypad 122 has the style according to the changed state. Even though the setting information on the movable unit 110 side is updated first in the above description, the setting information on the main body unit 120 side may be changed first. Even though the setting information on the movable unit 110 side is updated after the connection is established in the above description, the setting information may be updated before the connection is established. Even though the connection is disconnected after the backlight is switched in the above description, the connection may be disconnected before the backlight is switched.

Even though the connection is disconnected after the change of the character allocation is completed, the connection is not required to be immediately disconnected. For example, the connection established in Operation S13 may be used to transmit the input signal indicating the key operation of the user from the main body unit 120 to the movable unit 110. In this case, the connection may be disconnected after detecting that no key operation is sequentially performed for the fixed time or longer, for example. Shortening a time for maintaining the connection realizes further electric power saving.

Figure 11:
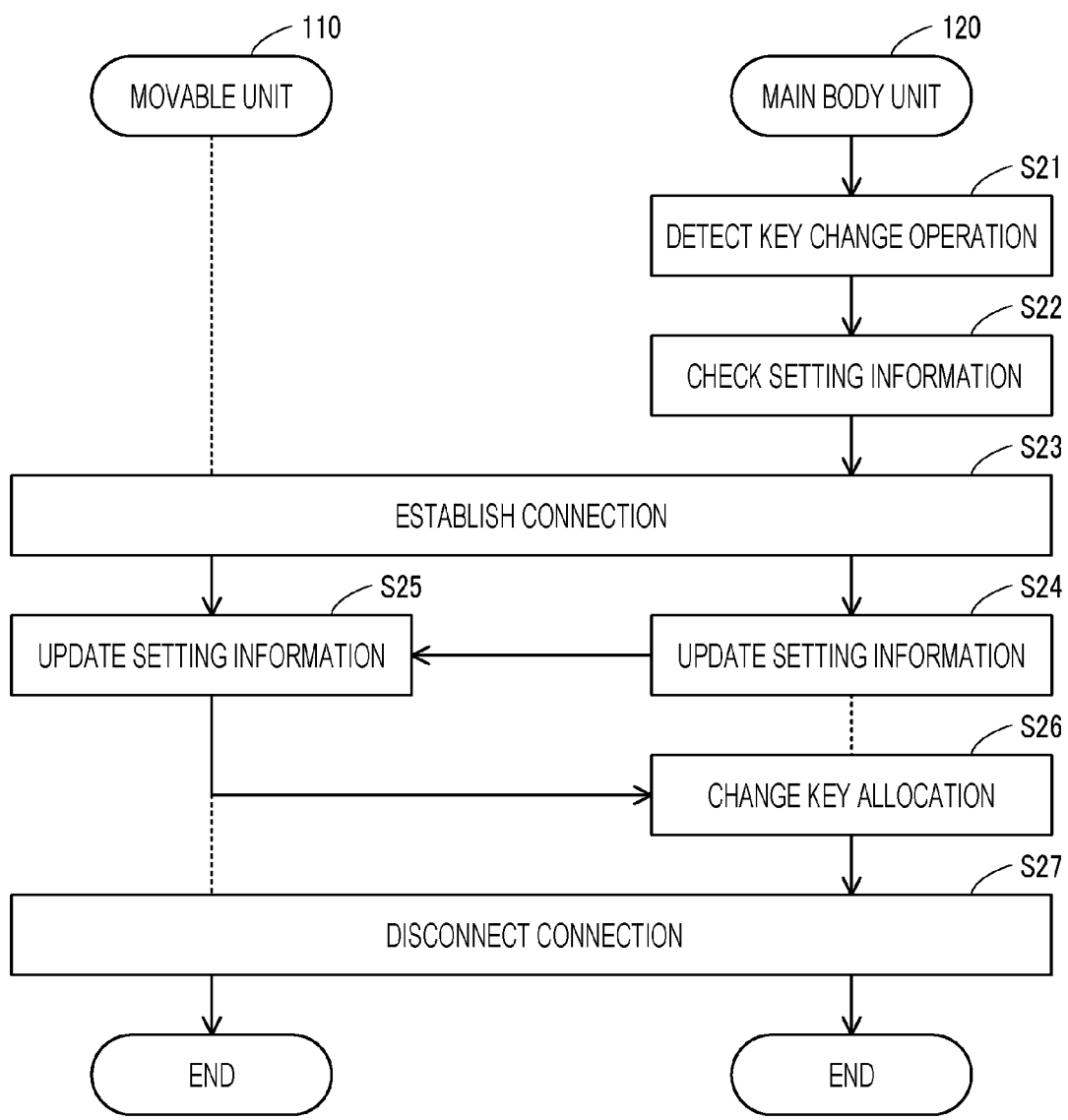
FIG. 11 is a second flowchart illustrating the key allocation control.

FIG. 11 is a second flowchart illustrating key allocation control. This flowchart indicates a manual change of the character allocation associated with the key operation of the user. Description will be made below of control processing illustrated in FIG. 11 according to the operation numbers of the flowchart.

(Operation S21) The key operation detection unit 136 detects that the user performs the prescribed key operation indicating the change of the character allocation on the keypad 122. The prescribed key operation is, for example, an operation for continuously pressing a prescribed input key such as a function key for the fixed time or longer.

(Operation S22) The setting change control unit 137 checks the setting information stored in the setting information storage unit 135. The setting change control unit 137 specifies the character allocation method after the change. For example, the setting change control unit 137 specifies the QWERTY style or the entertainment style. A correspondence relation between the prescribed key operation detected in Operation S21 and the character allocation method is set in advance. For example, every time when the prescribed key operation is performed, the QWERTY style and the entertainment style may be set to be alternately switched.

(Operation S23) The setting change control unit 137 sends the connection request to the setting change control unit 133 and establishes the connection between the setting change control unit 137 and the setting change control unit 133. The connection is established by the contact communication or the non-directional radio communication according to the present state of the movable unit 110.

(Operation S24) Based on the character allocation method specified in Operation S22, the setting change control unit 137 updates the information indicating the present character allocation method from among the setting information stored in the setting information storage unit 135. The setting change control unit 137 uses the connection established in Operation S23 to instruct the setting change control unit 133 to perform the setting change.

(Operation S25) Based on the instruction from the setting change control unit 137, the setting change control unit 133 updates the information indicating the present character allocation method from among the setting information stored in the setting information storage unit 131. The setting change control unit 133 reports the update completion of the setting information to the setting change control unit 137.

(Operation S26) Based on the setting information updated in Operation S24, the backlight control unit 138 changes the characters allocation to the input keys, that is, the control of turn-on and turn-off of the backlight of the keypad 122.

(Operation S27) The setting change control unit 137 sends a disconnection request to the setting change control unit 133 and disconnects the connection between the setting change control unit 137 and the setting change control unit 133. In this manner, when detecting the prescribed key operation by the user, the main body unit 120 controls in such a way that the keypad 122 has the style according to the key operation, and synchronizes the setting information of the movable unit 110 with the setting information of the main body unit 120.

Even though the setting information on the main body unit 120 side is updated first in the above described, the setting information on the movable unit 110 side may be updated first. Even though the switching of the backlight is performed after the setting information on the movable unit 110 side is updated in the above description, the switching of the backlight may be performed before the setting information on the movable unit 110 side is updated. Even though the setting information on the main body unit 120 side is updated after the establishment of the connection in the above description, the setting information on the main body unit 120 side may be updated before the establishment of the connection. Even though the connection is disconnected after the switching of the backlight in the above description, the connection may be disconnected before the switching of the backlight.

Even though the connection is disconnected after the change completion of the character allocation in the above description, the connection is not required to be disconnected immediately. Shortening the time for maintaining the connection realizes further electric power saving.

Figure 12:
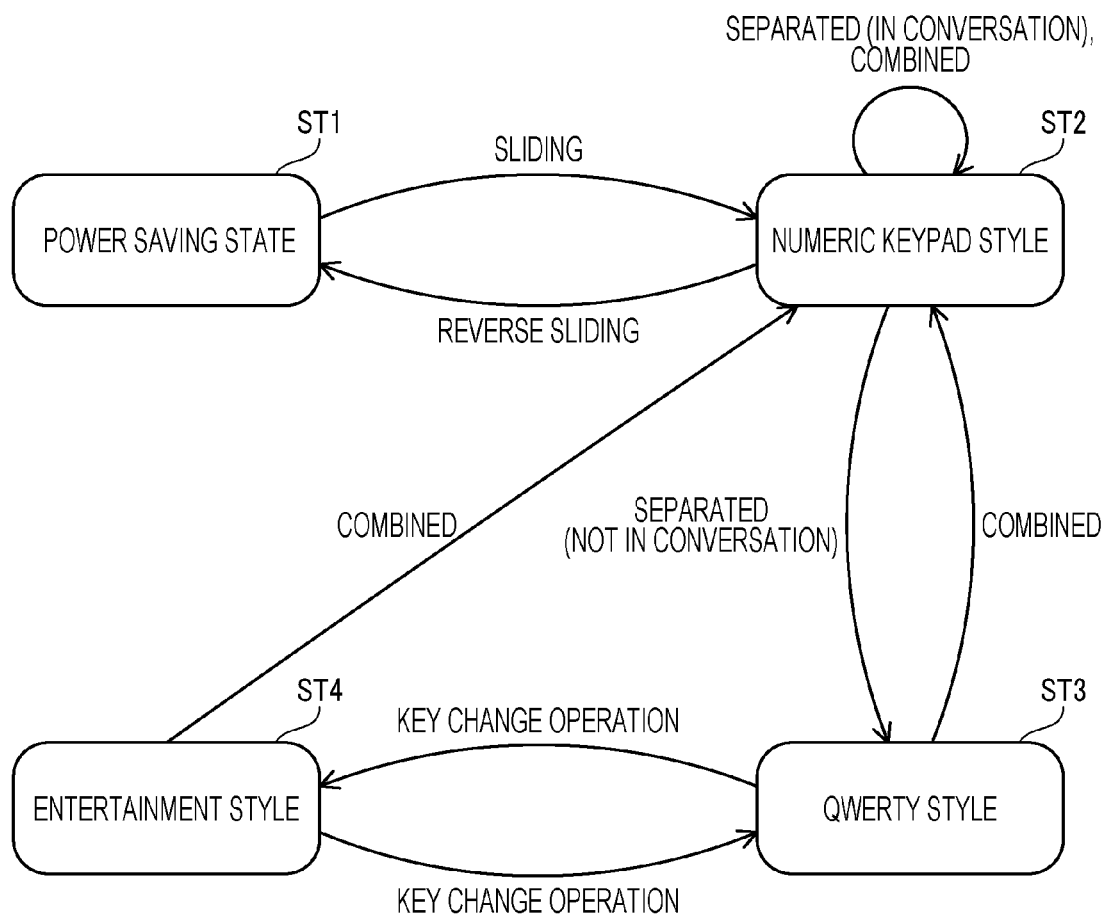
FIG. 12 is a state transition diagram illustrating a change example of the key allocation style.

FIG. 12 is a state transition diagram illustrating a change example of a key allocation style. In the setting information in FIG. 12, the sliding state is associated with the numerical keypad style, and the separated state is associated with the QWERTY style. In the housed state, the keypad 122 is in the electric power saving state. The QWERTY style is alternately switched to and from the entertainment style by the prescribed key operation by the user.

In the electric power saving state (ST1), the keypad 122 transits to the numerical keypad style (ST2) if the movable unit 110 is deformed from the housed state to the sliding state. In the numerical keypad style (ST2), the keypad 122 transits to the power saving state (ST1) if the movable unit 110 is deformed to the housed state from the sliding state.

In the numerical keypad style (ST2), the keypad 122 transits to the QWERTY style (ST3) if the movable unit 110 is deformed to the separated state from the sliding state. In the QWERTY style (ST3), the keypad 122 transits the numerical keypad style (ST2) if the movable unit 110 is deformed to the sliding state from the separated state.

If the movable unit 110 is deformed to the separated state from the sliding state during a conversation, the keypad 122 does not transit to the QWERTY style and the numerical keypad style remains. In the same manner as during the conversation, the keypad 122 is not required to transit while originating a call. Not only in a case of having a conversation, in a case where there is a low possibility of using the QWERTY keyboard, for example, in a case of viewing moving pictures, the keypad 122 may be controlled not to transit to the QWERTY style.

When the movable unit 100 is deformed to the separated state from the sliding state, the keypad 122 does not transit to the QWERTY style immediately and may be controlled to transit to the QWERTY at occurrence of an event that seems to have a high possibility of using the QWERT keyboard after a fixed waiting time. For example, the event may be pressing the input key, starting e-mail transmission and reception software, or the like.

In the QWERTY style (ST3), if the prescribed key operation is performed on the keypad 122, the keypad 122 transits to the entertainment style (ST4). In the entertainment style (ST4), the prescribed key operation is again performed, the keypad 122 transits to the QWERTY style (ST3).

According to the mobile phone 100 according to the second embodiment, the movable unit 110 having the display 111 is separated from the main body unit 120 having the keypad 122, so that the user may easily perform the key operation such as sentence input. Even in the housed state and the sliding state, the movable unit 110 and the main body unit 120 are not required to be wired by using a connector. This makes the structure of the mobile phone 100 simple and may reduce a possibility of occurrence of a fault due to metal fatigue.

According to the mobile phone 100 according to the second embodiment, the area that is not exposed before the separation may be effectively used as the area of the input key, so that the operability of the key input in the separated state is improved. In particular, the QWERTY keyboard is realized by using both the area that is exposed in the sliding state and the area that is exposed in the separated state, so that the size and key pitch of the input key may be large. This makes the key operation easier.

According to the mobile phone 100 according to the second embodiment, the character allocation to the input keys and the character display method may be changed in the sliding state and the separated state, so that various using methods of the mobile phone 100 may be flexibly accepted. According to the mobile phone 100 according to the second embodiment, since the backlight of a plurality of areas of the keypad 122 may be controlled, the electric power saving may be realized according to the state of the movable unit 110.

Third Embodiment

Description will be made of a third embodiment. Description will be made of a difference between the above-described second embodiment and the third embodiment, and the description of the same structure is omitted. The structure of the mobile phone according to the third embodiment is different from the structure of the mobile phone 100 according to the second embodiment in that the movable unit is slidable relative to the main body unit.

Figure 13A:
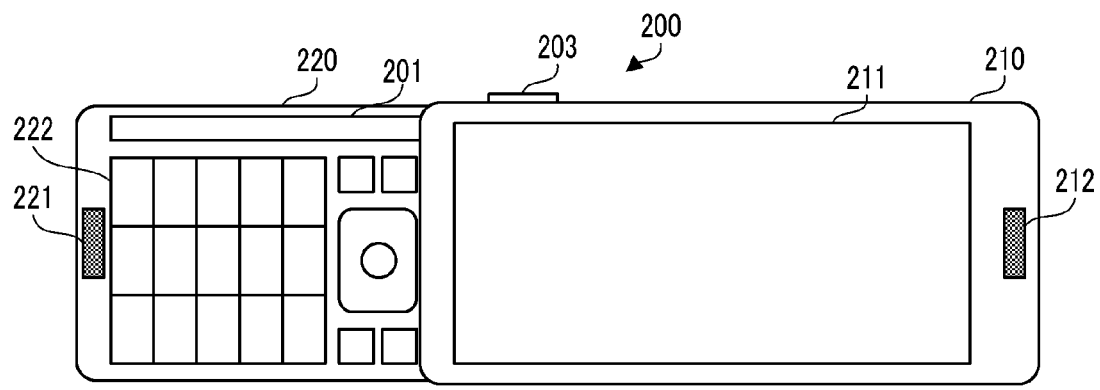
FIGS. 13A-13C are diagrams illustrating an appearance of a mobile phone according to a third embodiment.
Figure 13B:
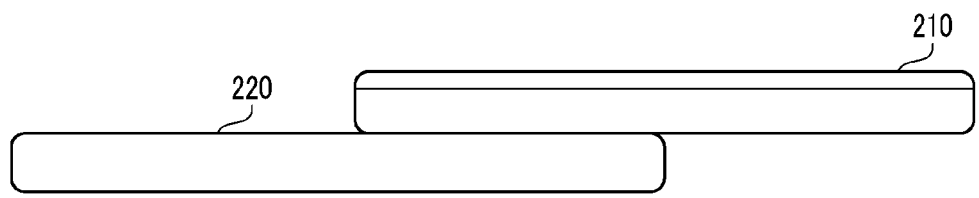
Figure 13C:
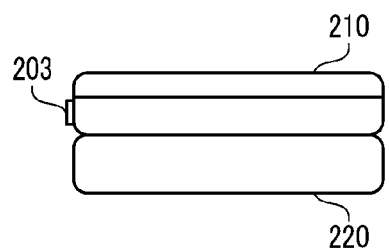
Figure 14A:
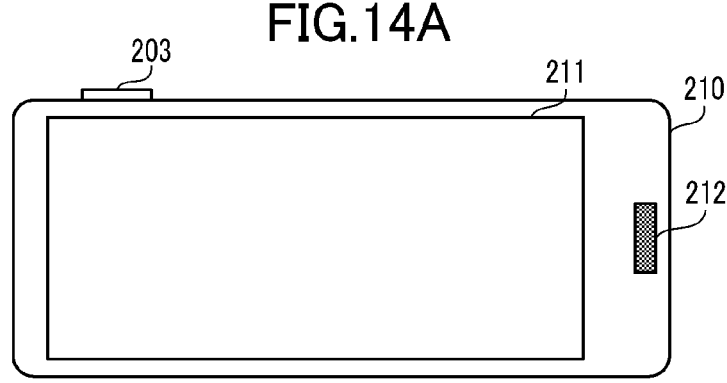
FIGS. 14A-14D are diagrams illustrating an appearance of the mobile phone in the separated state according to the third embodiment.
Figure 14B:
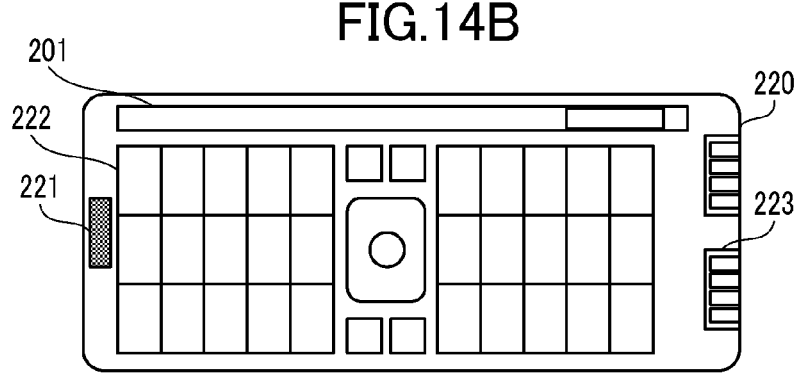
Figure 14C:
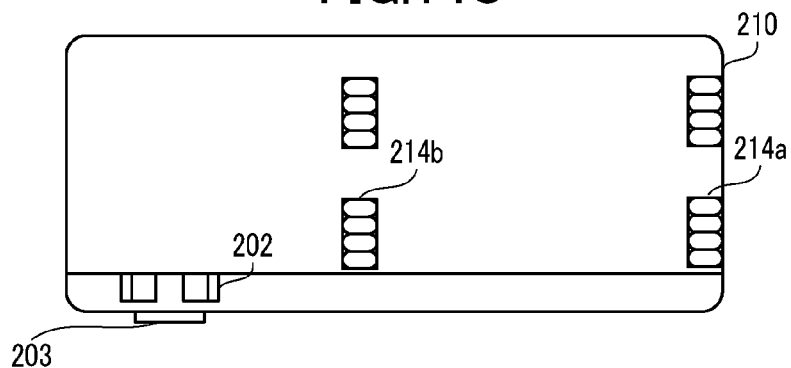
Figure 14D:
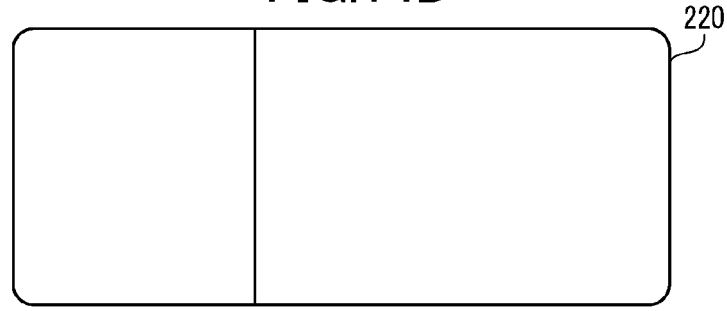

FIG. 13A to FIG. 13C are diagrams illustrating an appearance of the mobile phone according to the third embodiment. A mobile phone 200 according to the third embodiment includes a movable unit 210 and a main body unit 220. The movable unit 210 corresponds to the movable unit 110 of the second embodiment. The main body unit 220 corresponds to the main body unit 120 of the second embodiment. The movable unit 210 includes a display 211 and a speaker 212 in the front face thereof. The main body unit 220 includes a microphone 221 and a keypad 222 in the front face thereof.

The movable unit 210 is slidable relative to the long side direction of the main body unit 220. The main body unit 220 includes a rail unit 201 that has a recess in the front face thereof to slide the movable unit 210. The rail unit 201 is provided along the sliding direction toward the left side face on the upper side in FIG. 13A. The rail unit 201 may be provided toward the right side face on the lower side in FIG. 13A. The movable unit 210 includes a button 203. The button 203 is provided in the position toward the bottom face of the left side face on the left in FIG. 13A.

FIG. 14A to FIG. 14D are diagrams illustrating an appearance of a mobile phone in the separated state according to the third embodiment. The user may transit the mobile phone to the separated state from the sliding state illustrated in FIG. 13A or FIG. 13B by separating the movable unit 210 from the main body unit 220 while pressing the button 203. The movable unit 210 includes a contact pad 214a and a contact pad 214b on the back face thereof. The main body unit 220 includes a contact pad 223 on the front face thereof.

The movable unit 210 includes a hook unit 202 on the back face thereof. The hook unit 202 is provided near the button 203 toward the left side face on the upper side in FIG. 14A. The hook unit 202 is opened while the button 203 is being pressed. The hook unit 202 is closed while the button 203 is not being pressed. The hook unit 202 may be hooked on a sliding stand that is provided inside the rail unit 201. The user may combine the movable unit 210 with the main body unit 220 by placing the sliding stand of the rail unit 201 opposite to the hook unit 202 while pressing the button 203 and detaching the finger from the button 203. The sliding stand is slid inside the rail unit 201.

In the example of FIG. 13A and FIG. 13B, the movable unit 210 is slidable in the long side direction. The movable unit 210 is slidable also in the short side direction. In this case, the rail unit and the hook unit may be provided toward the bottom face on the left side in FIG. 13A or toward the top face on the right side in FIG. 13A. The movable unit 210 is slidable both in the long side direction and in the short side direction. In this case, both the rail unit and the hook unit used to slide the movable unit 210 in the long side direction and the rail unit and hook unit used to slide the movable unit 210 in the short side direction may be provided.

According to the mobile phone 200 according to the third embodiment, as with the mobile phone 100 according to the second embodiment, the movable unit 210 may be structured to be slidable relative to the main body unit 220 and to be separable from the main body unit 220.

Fourth Embodiment

Description will be made of a fourth embodiment. A difference between the above-described second embodiment and the fourth embodiment will be mainly described, and description of the same structure is omitted. The mobile phone according to the fourth embodiment is provided with the whole control function of the mobile phone in the main body unit instead of the movable unit.

Figure 15:
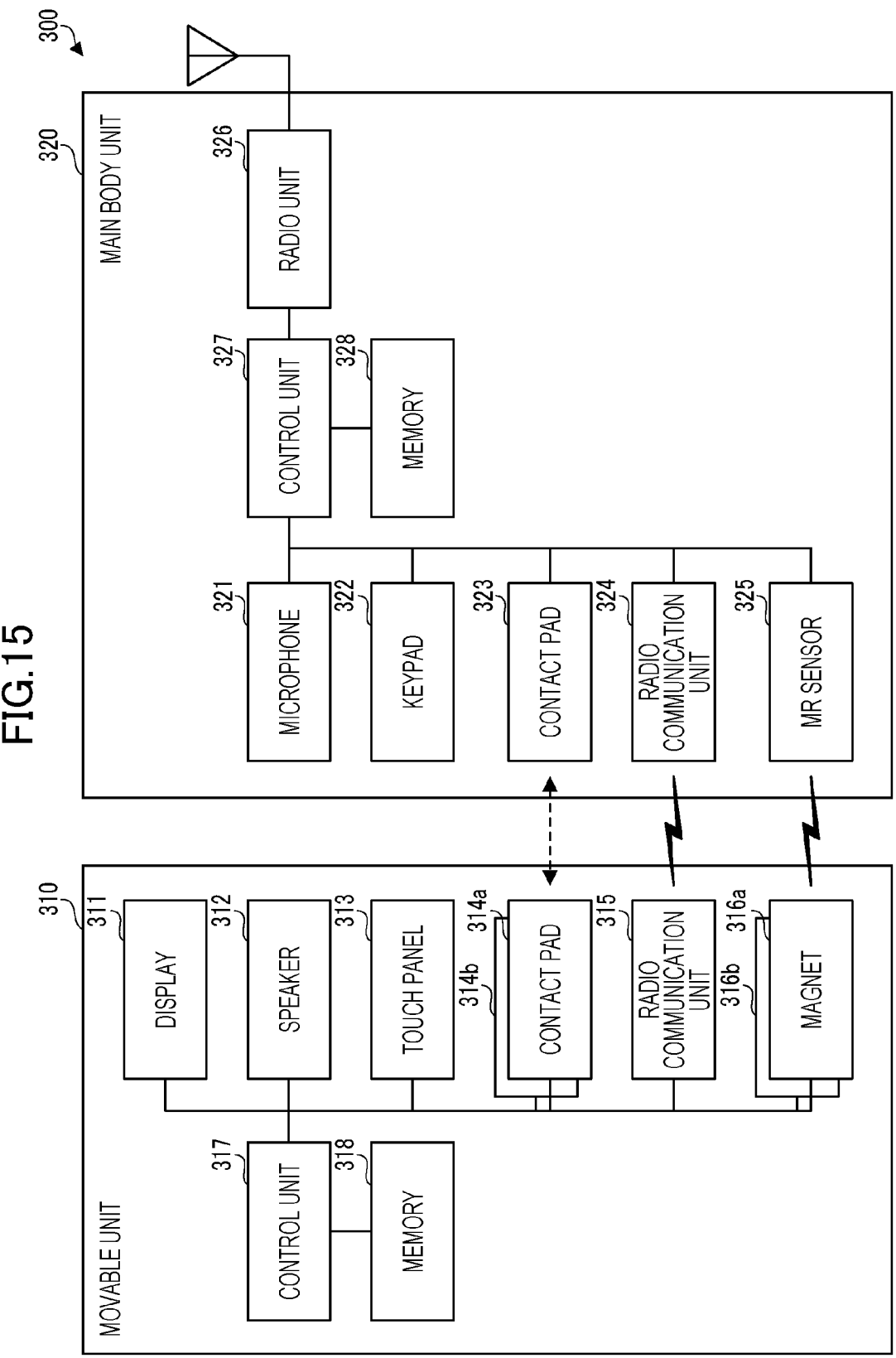
FIG. 15 is a block diagram illustrating hardware of a mobile phone according to a fourth embodiment.

FIG. 15 is a block diagram illustrating hardware of the mobile phone according to the fourth embodiment. The mobile phone 300 according to the fourth embodiment includes a movable unit 310 and a main body unit 320. The movable unit 310 corresponds to the movable unit 110 according to the second embodiment. The main body unit 320 corresponds to the main body unit 120 according to the second embodiment.

The movable unit 310 includes a display 311, a speaker 312, a touch panel 313, contact pads 314a and 314b, a radio communication unit 315, magnets 316a and 316b, a control unit 317, and a memory 318. The functions of the above-described units are the same as the functions of the display 111, the speaker 112, the touch panel 113, the contact pads 114a and 114b, the radio communication unit 115, the magnets 125a and 125b, the control unit 126, and the memory 127 according to the second embodiment, respectively.

The main body unit 320 includes a microphone 321, a keypad 322, a contact pad 323, a radio communication unit 324, an MR sensor 325, a radio unit 326, a control unit 327, and a memory 328. The functions of the above-described units are the same as the functions of the microphone 121, the keypad 122, the contact pad 123, the radio communication unit 124, the MR sensor 116, the radio unit 117, and the memory 119, respectively, according to the second embodiment.

In the fourth embodiment, the main body unit 320 includes a radio communication function with respect to a base station, and a main control function. The control unit 317 controls operations on the movable unit 310 side based on the control of the control unit 327. The control unit 317 detects the contact state of the contact pads 314a and 314b and reports the detection to the control unit 327 by a non-directional radio communication, for example. The control unit 327 controls the whole mobile phone 300. Based on the contact state and the detection state of a magnetic field, the control unit 327 determines the state of the movable unit 310 and controls the backlight of the keypad 322. The state determined by the movable unit 310 is the housed state, the sliding state, or the separated state.

The processing ability of the control unit 317 is not required to be the same as of the control unit 327. For example, the calculation ability of the CPU of the control unit 317 may be lower than the calculation ability of the CPU of the control unit 327. In FIG. 15, the movable unit 310 is provided with two contact pads: the contact pad 314a and the contact pad 314b, and the main body unit 320 is provided with one contact pad: the contact pad 323. The numbers of the contact pads may be reversed. The positions of the MR sensor 325 and the magnets 316a and 316b may be reversed. As described in the second embodiment, the movable unit 310 and the main body unit 320 may perform the communication by a directional radio communication method, for example, an infrared communication method. In this case, radio ports such as infrared ports, for example, may be provided instead of the contact pads 314a, 314b, and 323.

According to the mobile phone 300 according to the fourth embodiment, as with the mobile phone 100 according to the second embodiment, the character allocation to the input keys may be changed according to the state of the movable unit 310. Since the main body unit 320 has the main control function, the mobile phone 300 has a possibility of changing the character allocation without establishing the connection between the movable unit 310 and the main body unit 320.

Fifth Embodiment

Description will be made of a fifth embodiment. A difference between the above-described second embodiment and the fifth embodiment will be mainly described, and description of the same structure is omitted. A mobile phone according to the fifth embodiment is able to distinguish the housed state from the separated state by using only the MR sensor.

FIG. 16A to FIG. 16C are diagrams illustrating a state detection method according to the fifth embodiment. A mobile phone 400 according to the fifth embodiment includes a movable unit 410 and a main body unit 420. The movable unit 410 corresponds to the movable unit 110 according to the second embodiment. The main body unit 420 corresponds to the main body unit 120 according to the second embodiment. FIG. 16A to FIG. 16C illustrates the front face of the movable unit 410 and the main body unit 420. Even though the movable unit 410 is arranged aside the main body unit 420 in the figures, the movable unit 410 is actually overlapped with the main body unit 420.

The movable unit 410 includes an MR sensor 416a in the position toward the left side face and the bottom face on the left side in FIG. 16A and includes an MR sensor 416b in the position toward the right side face and the bottom face on the right side in FIG. 16A. The main body unit 420 includes a magnet 425a in the position near the center of the long side direction toward the left side face and includes a magnet 425b in the position toward the right side face and the bottom face.

In the housed state in FIG. 16A, the MR sensor 416b is placed opposite to the magnet 425b. Consequently, the MR sensor 416b detects the magnetic field. In the sliding state illustrated in FIG. 16B, the MR sensor 416a is placed opposite to the magnet 425a. Consequently, the MR sensor 416a detects the magnetic field. In the separated state illustrated in FIG. 16C, neither the MR sensor 416a nor the MR sensor 416b is placed opposite to the magnet 425a or the magnet 425b. Accordingly, the MR sensors 416a and 416b do not detect the magnetic field.

Therefore, the movable unit 410 is able to distinguish and detect the housed state, the sliding state, and the separated state. That is, if the MR sensor 416a has Detection-OFF and the MR sensor 416b has Detection-ON, the movable unit 410 may determine the housed state. If the MR sensor 416a has Detection-ON and the MR sensor 416b has Detection-OFF, the movable unit 410 may determine the sliding state. If both the MR sensor 416a and the MR sensor 426b have Detection OFF, the movable unit 410 may determine the separated state.

Even when the MR sensors 416a and 416b are arranged aside the movable unit 410 in the long side direction, and the magnets 425a and 425b are arranged aside the main body unit 420 in the long side direction, the housed state, the sliding state, and the separated state may be distinguished and detected.

According to the mobile phone 400 according to the fifth embodiment, as with the mobile phone 100 according to the second embodiment, the state of the movable unit 410 is specified, and the character allocation to the input keys is dynamically changeable. According to the mobile phone 400 according to the fifth embodiment, it is possible to distinguish the housed state, the sliding state, and the separated state by magnetic detection without checking whether or not the contact communication may be performed. Therefore, according to the mobile phone 400 according to the fifth embodiment, speed improvement of state specification and suppression of power consumption associated with the communication may be realized.

The configurations of the second to fifth embodiments may be arbitrarily combined. To realize the functions of the second to fifth embodiments by programs, the programs may be incorporated after the mobile phones 100, 200, 300, and 400 are manufactured. The program may be stored in a computer-readable recording medium. The recording medium may be, for example, a magnetic recording device, an optical disk, a magneto-optical recording medium, or a semiconductor memory. The magnetic recording device may be a Hard Disk Drive (HDD), a Flexible Disk (FD), a magnetic tape, or the like. The optical disk may be a Compact Disc (CD), a Compact Disc-Recordable (CD-R)/ReWritable (RW), a Digital Versatile Disc (DVD), a DVD-R/RW/RAM, or the like. The magneto-optical recording medium may be a Magneto-Optical disk or the like.

To distribute the program, a portable recording medium in which the program is recorded is transferred, for example. The program may be stored in a recording device of a server computer and may be transferred to the mobile phones 100, 200, 300, and 400 from the server computer via a network. The mobile phones 100, 200, 300, and 400 obtain the program recorded in, for example, a portable recording medium or stored in the server computer, store the program in a nonvolatile memory, and perform the program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that various changes, substitutions, and alterations could be made hereto without departing from the spirit and scope of the invention.

What is claimed is:

1. A mobile terminal device, comprising:
   a first housing,
   a second housing, the device having multiple configurations, including:
   a first configuration in which the second housing is closed with respect to the first housing, a second configuration in which the second housing is slid relative to the first housing from the first configuration, and a third configuration in which the first housing is separated from the second housing,
   a first input key is provided on the first housing, and is covered with the second housing in the first and second configurations and is exposed in the third configuration;
   a second input key which is provided on the first housing, and is covered with the second housing in the first configuration and is exposed in the second and third configurations; and
   a control unit which allocates a character group to an input key group which includes the first input key and the second input key in the third configuration.

2. The mobile terminal device according to claim 1, further comprising:
   a control unit which allocates a different character to the second input key in the second configuration and the third configuration, respectively.

3. The mobile terminal device according to claim 2, wherein the control unit does not change the character to be allocated to the second input key, when the configuration is deformed from the second configuration to the third configuration while a prescribed communication is being performed.

4. The mobile terminal device according to claim 1, further comprising:
   a control unit which allows a first character to be displayed on the second input key in the second configuration and allows additional characters to be displayed on the first input key and the second input key at an angle in the third configuration which is different from the angle of the first character in the second configuration.

5. The mobile terminal device according to claim 1, further comprising:
   a control unit which does not allow a character to be displayed on the second input key in the first configuration and allows the character to be displayed on the second input key in the second and third configurations.

6. The mobile terminal device according to claim 1, wherein the control unit is provided inside the second housing and controls the first input key and the second input key by communicating with the first housing.

7. The mobile terminal device according to claim 1, further comprising:
   a control unit which does not allow a character to be displayed on the first input key in the first and second configurations and allows the character to be displayed on the first input key in the third configuration.

8. The mobile terminal device according to claim 7,
   wherein either the first housing or the second housing comprises a magnetic body and the other housing comprises a magnetic sensor, and
   wherein the control unit determines whether or not the first housing is separated from the second housing according to a detection state of the magnetic body by the magnetic sensor.

* * * * *